US010454338B2

(12) United States Patent
Jung et al.

(10) Patent No.: US 10,454,338 B2
(45) Date of Patent: Oct. 22, 2019

(54) CASE FOR ELECTRIC MOTOR

(71) Applicant: LG Electronics Inc., Seoul (KR)

(72) Inventors: Seungmo Jung, Seoul (KR); Taehee Kwak, Seoul (KR); Hyeongjun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 212 days.

(21) Appl. No.: 15/654,351

(22) Filed: Jul. 19, 2017

(65) Prior Publication Data
US 2018/0026493 A1 Jan. 25, 2018

Related U.S. Application Data

(60) Provisional application No. 62/364,840, filed on Jul. 20, 2016.

(30) Foreign Application Priority Data

Jun. 1, 2017 (KR) .......................... 10-2017-0068620

(51) Int. Cl.
*H02K 5/20* (2006.01)
*H02K 5/22* (2006.01)
*H02K 5/24* (2006.01)
*H02K 9/00* (2006.01)

(52) U.S. Cl.
CPC ............... *H02K 5/20* (2013.01); *H02K 5/225* (2013.01); *H02K 5/24* (2013.01); *H02K 9/005* (2013.01)

(58) Field of Classification Search
CPC .. H02K 5/22; H02K 9/00; H02K 5/20; H02K 9/005; H02K 5/24; H02K 5/225

USPC ......................................... 310/89, 71, 52–64
See application file for complete search history.

(56) References Cited

U.S. PATENT DOCUMENTS

| 6,822,353 B2* | 11/2004 | Koga ..................... F28D 1/035 310/52 |
| 2008/0169088 A1* | 7/2008 | Aoki ..................... H01L 23/473 165/104.19 |
| 2008/0179972 A1* | 7/2008 | Aoki ..................... H01L 21/4878 310/52 |
| 2009/0250271 A1* | 10/2009 | Komatsu ................ B60K 17/04 180/65.6 |

(Continued)

FOREIGN PATENT DOCUMENTS

| JP | 2014-58910 A | 4/2014 |
| JP | 2014-75870 A | 4/2014 |

(Continued)

*Primary Examiner* — Naishadh N Desai
(74) *Attorney, Agent, or Firm* — Birch, Stewart, Kolasch & Birch, LLP

(57) ABSTRACT

A case for an electric motor includes a case body provided with an inner case and an outer case together forming a cooling fluid flow path penetratingly formed in an axial direction of the case body, and a circuit component mounting portion protruding from an outer surface of the outer case to mount a circuit component such that the circuit component is cooled by cooling fluid. Case covers are coupled to both end portions of the case body so that the electric motor and the circuit component can be simultaneously cooled by the single cooling fluid flow path. In this way, a separate circuit component case for mounting the circuit component can be excluded, thereby reducing a size and weight of the case.

18 Claims, 19 Drawing Sheets

(56) References Cited

U.S. PATENT DOCUMENTS

| | | | | |
|---|---|---|---|---|
| 2010/0013331 | A1* | 1/2010 | Yoshida | H02K 5/20 |
| | | | | 310/64 |
| 2014/0127049 | A1* | 5/2014 | Yoneda | F04D 25/062 |
| | | | | 417/354 |
| 2014/0354089 | A1* | 12/2014 | Chamberlin | H02K 9/19 |
| | | | | 310/54 |

FOREIGN PATENT DOCUMENTS

| | | | |
|---|---|---|---|
| KR | 10-2015-0062529 | A | 6/2015 |
| KR | 10-1700768 | B1 | 1/2017 |

\* cited by examiner

CASE FOR ELECTRIC MOTOR

CROSS-REFERENCE TO RELATED APPLICATION

Pursuant to 35 U.S.C. § 119(a), this application claims the benefit of an earlier filing date of and the right of priority to U.S. Provisional Application No. 62/364,840, filed on Jul. 20, 2016 and Korean Application No. 10-2017-0068620, filed on Jun. 1, 2017, the entire contents of both of which are hereby incorporated by reference herein in their entireties.

BACKGROUND OF THE INVENTION

1. Field of the Invention

The present invention relates to a case for an electric motor.

2. Background of the Invention

As is well known, an electric motor is a device that converts electric energy into kinetic energy.

Such electric motors are classified into a direct-current (DC) motor and an alternating current (AC) motor according to a type of power source.

The electric motor includes a stator and a rotor arranged to be movable relative to the stator.

The rotor is rotatably provided with a predetermined gap from the stator.

The electric motor includes a case for accommodating the stator and the rotor therein.

Temperature of the electric motor rises due to heat generated from the stator and the rotor during operation.

The output of the motor is remarkably lowered when the temperature rises excessively.

The electric motor is provided with a cooling unit for suppressing a rise in temperature.

An air cooling type using air and a water cooling type using cooling fluid (cooling water) are used as a method of cooling the electric motor.

However, in the related art electric motor, a cooling fluid flow path in a spiral shape is formed along a periphery of the case, and accordingly, a heat exchange area between the cooling fluid and the case is relatively small, which causes a limit in improving cooling performance.

A case for an electric motor, a fabricating method thereof, and an electric motor having the case for the electric motor considering such problems are disclosed in Korean Patent Registration No. 10-1700768.

The electric motor is connected to an inverter so as to receive AC power for converting frequencies.

Since the inverter includes a power conversion element, the inverter generates heat during operation and the temperature of the inverter rises.

When the temperature rises excessively, the inverter may cause an error or a functional deterioration and/or a functional stop.

In consideration of such problems, the inverter is provided with a cooling unit.

However, in the related art electric motor, when the electric motor and the inverter are each provided with separate cooling units, the sizes and weights of the electric motor, the inverter and the cooling unit are increased.

Further, when the sizes of the motor, the inverter, and the cooling unit are increased, they occupy a larger space when mounted in a vehicle. This causes an engine room of the vehicle to be increased, and thereby a boarding space of the vehicle to be reduced.

In addition, since the cooling unit of the electric motor and the cooling unit of the inverter are fabricated separately, a relatively long time and much effort are required to fabricate and install them.

Since the weights of the electric motor, the inverter, and the cooling unit are increased, a battery consumption of the vehicle is increased, thereby reducing a traveling (driving) distance of the vehicle.

Furthermore, the battery consumption of the vehicle is accelerated and a charging period of the battery is shortened accordingly. This causes an increase in a waiting time for charging, thereby bringing about inconvenience in driving the vehicle when charging is required.

SUMMARY OF THE INVENTION

Therefore, an aspect of the present invention is to provide a case for an electric motor, capable of reducing size and weight by allowing a motor and an inverter to be cooled through a single cooling flow path.

Another aspect of the present invention is to provide a case for an electric motor, capable of facilitating easier fabrication and installation.

Another aspect of the present invention is to provide a case for an electric motor, capable of preventing heat generation from a power line connection area.

Another aspect of the present invention is to provide a case for an electric motor, capable of preventing a generation of vibration of circuit components.

To achieve these and other advantages and in accordance with the purpose of this specification, as embodied and broadly described herein, there is provided a case for an electric motor, the case including a case body provided with an inner case having a stator accommodating space penetratingly formed therein in an axial direction, an outer case disposed outside the inner case and forming a cooling fluid flow path, penetratingly formed in the axial direction, with being spaced apart from the inner case, and a circuit component mounting portion disposed outside the outer case to mount a circuit component thereon such that the circuit component is cooled by the cooling fluid, and case covers coupled to both end portions of the case body to block the stator accommodating space and the cooling fluid flow path, respectively.

In accordance with one embodiment disclosed herein, the electric motor may include a stator, and a rotor disposed within the stator to be rotatable with respect to the stator.

In accordance with one embodiment disclosed herein, the circuit component may include an inverter, and one of the case covers may be provided with a bus bar extending from the inverter, and a terminal block connecting a power line extending from the stator.

In accordance with one embodiment disclosed herein, the case cover may be provided with a terminal block cooling portion for cooling the terminal block.

In accordance with one embodiment disclosed herein, the terminal block cooling portion may be provided with a cooling fluid inlet portion through which the cooling fluid is introduced.

In accordance with one embodiment disclosed herein, the terminal block cooling portion may be provided with a communicating portion communicating with the cooling fluid flow path.

In accordance with one embodiment disclosed herein, the circuit component and the circuit component mounting portion may be provided with a circuit component vibration suppressing unit detachably coupled in the axial direction to suppress a generation of vibration from the circuit component.

In accordance with one embodiment disclosed herein, the circuit component vibration suppressing unit may include a coupling protrusion protruding from one of the circuit component and the circuit component mounting portion, and a coupling protrusion receiving portion formed on another of the circuit component and the circuit component mounting portion for receiving the coupling protrusion therein.

In accordance with one embodiment disclosed herein, the circuit component mounting portion may include an inverter mounting portion in which the inverter is mounted. The inverter may have a more reduced length in the axial direction than the inverter mounting portion. The case cover may be provided with an inverter supporting portion brought into contact with the inverter to support the inverter.

In accordance with one embodiment disclosed herein, the coupling protrusion may be formed on the inverter, and the inverter supporting portion may protrude from an inner surface of the case cover, so as to be inserted into the coupling protrusion receiving portion and brought into contact with the coupling protrusion.

In accordance with one embodiment disclosed herein, the inverter mounting portion may be provided at one side thereof with a plurality of cooling fins brought into contact with the cooling fluid.

In accordance with one embodiment disclosed herein, the cooling fluid flow path may include a flow path extending portion extending toward the inverter mounting portion, and the plurality of cooling fins may be arranged within the flow path extending portion.

In accordance with one embodiment disclosed herein, the flow path extending portion may be penetratingly formed in the axial direction, and the plurality of cooling fins may extend along the axial direction and be arranged in parallel perpendicularly to the axial direction.

In accordance with one embodiment disclosed herein, the circuit component may include a capacitor providing direct current (DC) power to the inverter, and the circuit component mounting portion may be provided with a capacitor mounting portion in which the capacitor is mounted.

In accordance with one embodiment disclosed herein, the capacitor may have a more reduced length in the axial direction than the capacitor mounting portion, and the case cover may be provided with a capacitor supporting portion supporting the capacitor in the axial direction.

In accordance with one embodiment disclosed herein, the coupling protrusion may be formed on the capacitor. The capacitor supporting portion may protrude from an inner surface of the case cover, so as to be inserted into the coupling protrusion receiving portion and brought into contact with the coupling protrusion.

In accordance with one embodiment disclosed herein, the terminal block and the terminal block cooling portion may be provided therebetween with a heat transfer member for transferring heat of the terminal block to the terminal block cooling portion.

In accordance with one embodiment disclosed herein, the outer case and the inner case may be provided therebetween with a plurality of barrier walls partitioning the cooling fluid flow path in a circumferential direction to form a plurality of partial flow paths. The case cover may be provided with a plurality of flow path communicating portions communicating the plurality of partial flow paths with one another in series.

In accordance with one embodiment disclosed herein, the case cover may be provided with a cooling fluid outlet portion through which the cooling fluid is discharged.

In accordance with one embodiment disclosed herein, the circuit component mounting portion may be provided with a mounting surface formed on an outer surface of the outer case, a side surface protruding from one side of the mounting surface, and a ceiling surface extending from the side surface. The circuit component mounting portion may have a circuit component mounting space penetratingly formed therein in the axial direction.

The inverter mounting portion may be provided with a mounting surface on which the inverter is mounted, a side surface protruding from one side of the mounting surface, and a ceiling surface extending from the side surface. The inverter mounting portion may be provided therein with an inverter mounting space penetratingly formed in the axial direction.

The capacitor mounting portion may be provided with a mounting surface on which the capacitor is mounted, a side surface protruding from one side of the mounting surface, and a ceiling surface extending from the side surface. The capacitor mounting portion may be provided therein with a capacitor mounting space penetratingly formed in the axial direction.

The circuit component mounting portion may be provided with mounting surfaces on which the inverter and the capacitor are mounted, respectively, side surfaces protruding from one side of each of the mounting surfaces, and ceiling surfaces extending from the side surfaces, respectively. The circuit component mounting portion may be provided therein with an inverter mounting space and a capacitor mounting space penetratingly formed in the axial direction and communicating with each other.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. A singular representation may include a plural representation unless it represents a definitely different meaning from the context. In describing the present invention, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Figure 1:
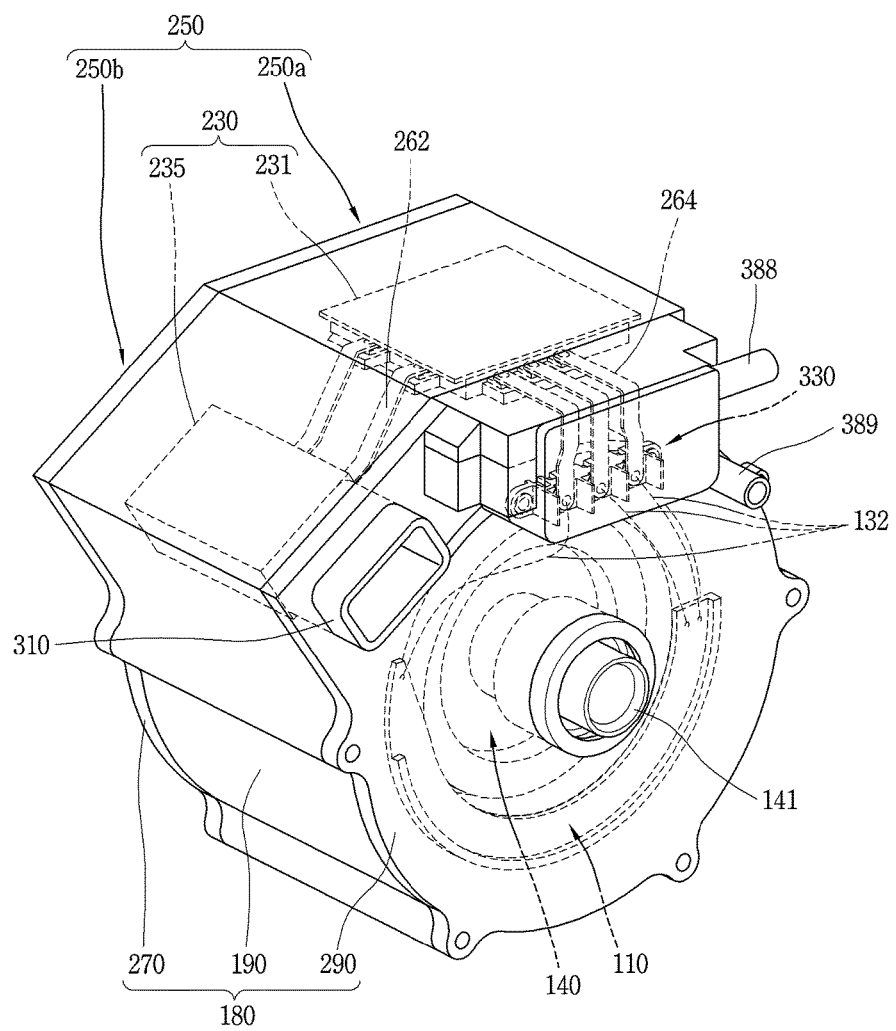
FIG. 1 is a perspective view of an electric motor having a case for an electric motor in accordance with one embodiment of the present invention.
Figure 2:
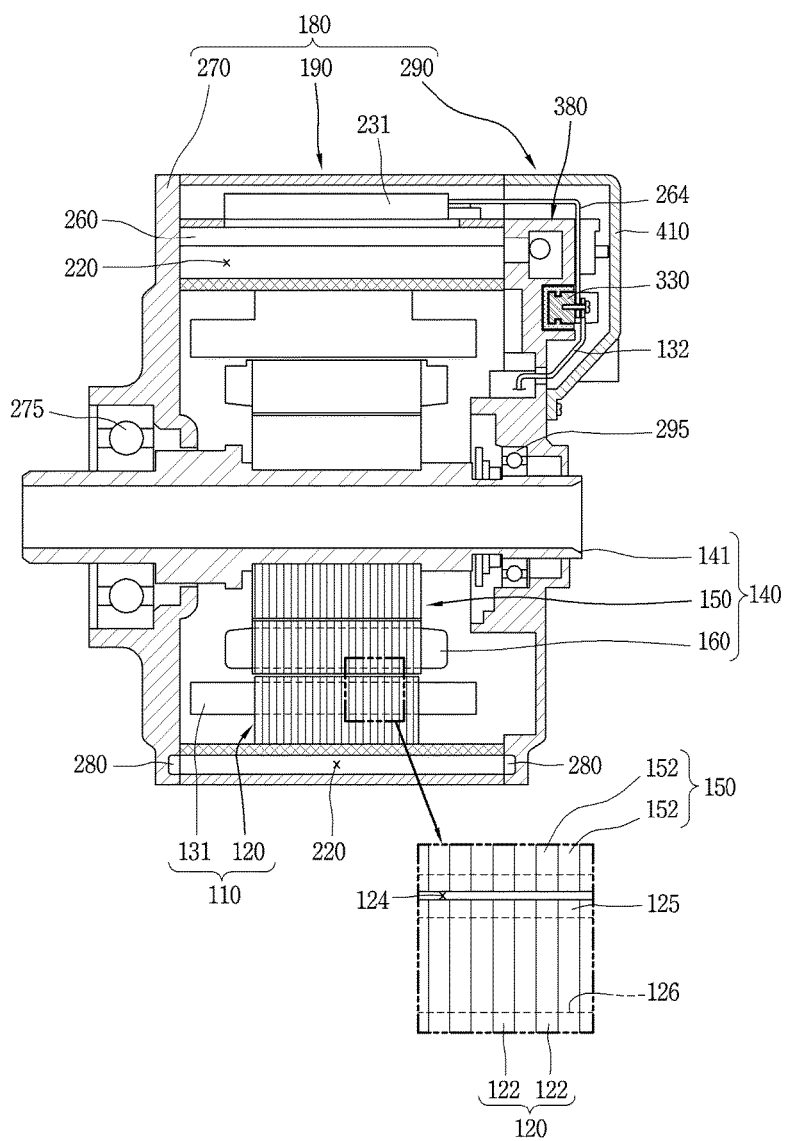
FIG. 2 is a sectional view of the electric motor of FIG. 1.

FIG. 1 is a perspective view of an electric motor having a case for the electric motor according to an embodiment of the present invention, and FIG. 2 is a sectional view of the electric motor of FIG. 1.

As illustrated in FIGS. 1 and 2, an electric motor having a case for the electric motor according to an embodiment of the present invention includes a stator 110 provided with a stator core 120 and a stator coil 131 wound around the stator core 120, a rotor 140 having a rotating shaft 141 and rotatably disposed with a preset gap from the stator core 120, and a motor case (case for the electric motor) 180 for accommodating the stator 110 and the rotor 140 therein.

The stator 110 may include the stator core 120 and the stator coil 131 wound around the stator core 120.

The stator core 120 may have, for example, a cylindrical shape.

The stator core 120 may include, for example, a rotor accommodating opening 124 formed through a central portion thereof so that the rotor 140 is rotatably accommodated therein.

The stator core 120, for example, may be formed by stacking a plurality of electric steel plates 122, each having the rotor accommodating opening 124, in an insulating manner.

Each of the plurality of electric steel plates 122 may have, for example, a disk shape.

A coupling protrusion accommodating portion 133 (see FIG. 4) may be recessed into an outer circumferential surface of the stator core 120 along a radial direction and penetratingly extend along an axial direction.

The stator core 120 may be inserted into and separated from an inner case 200 (see FIG. 5) of a case body 190, which will be described later, along the axial direction.

The stator core 120 may include a plurality of poles 125 and slots 126 alternately arranged in a circumferential direction of the rotor accommodating opening 124.

The stator coil 131 may include a plurality of conductors inserted into the plurality of slots 126, for example.

The plurality of conductors may be made of, for example, rectangular copper wire having a rectangular cross section.

The plurality of conductors may be inserted into the respective slots 126 so as to form a plurality of layers in the radial direction.

The stator coil 131 may be configured to receive three-phase AC power, for example.

The stator coil 131 may be provided with three power lines 132 (lead wires or power cables) connected to each phase (a first phase (U phase), a second phase (V phase) and a third phase (W phase)) of the three-phase AC power.

A connection ring 134 (see FIG. 5) for connecting the conductors of the stator coil 131 may be provided on one end portion of the stator coil 131.

The three power lines 132 may be connected to the connection ring 134 at preset positions.

The rotor 140, for example, may include a rotating shaft 141, a rotor core 150 formed by stacking a plurality of steel plates 152 in an insulating manner and rotating centering on the rotating shaft 141, and a rotor coil 160 wound around the rotor core 150.

Alternatively, for example, the rotor 140 may include the rotating shaft 141, a permanent magnet (not illustrated) concentrically disposed on the rotating shaft 141, and a rotor frame (not illustrated) provided between the rotating shaft 141 and the permanent magnet.

The rotating shaft 141 may be rotatably supported by bearings 275 and 295, for example.

The bearings 275 and 295, for example, may be provided on both sides of the rotor core 150, respectively.

The stator 110 may be inserted into a case 180 for the electric motor according to the one embodiment of the present invention.

The case 180, for example, may include a case body 190 penetratingly formed in an axial direction, and case covers 270 and 290 provided on both sides of the case body 190, respectively.

The case body 190, for example, may include an inner case 200 (see FIG. 5) having a stator accommodating space 201 (see FIG. 4) penetratingly formed therein in the axial direction, an outer case 210 (see FIG. 5) disposed outside the inner case 200 and forming a cooling fluid flow path 220 penetratingly formed in the axial direction together with the inner case 200, and a circuit component mounting portion 250 provided on an outside of the outer case 210 to mount a circuit component thereon such that the circuit component is cooled by the cooling fluid.

The inner case 200 may have, for example, a cylindrical shape.

The inner case 200 may be formed with both sides open.

The outer case 210 may be concentrically arranged at the outside of the inner case 200, for example.

The cooling fluid flow path 220 may be formed between the inner case 200 and the outer case 210.

The cooling fluid flow path 220 may be penetratingly formed in the axial direction, for example.

The cooling fluid may include, for example, water (cooling water).

The cooling fluid may include, for example, an antifreeze solution.

The circuit component mounting portion 250 may include mounting surfaces 252a and 252b (see FIG. 5) formed on an outer surface of the outer case 210, for example.

The mounting surfaces 252a and 252b of the circuit component mounting portion 250 may be formed as, for example, rectangular flat surfaces.

The circuit component mounting portion 250, for example, may include side surfaces 254a and 254b protruding from one side portion of each of the mounting surfaces 252a and 252b, and ceiling surfaces 256a and 256b (see FIG. 5) extending from the side surfaces 254a and 254b (see FIG. 5), respectively.

Circuit component mounting spaces 258, for example, may have therein circuit component mounting spaces 258a and 258b penetratingly formed in the axial direction.

With this configuration, the circuit component mounting spaces 258a and 258b may be cooled by the cooling fluid flow path 220.

Accordingly, a separate case is not required for mounting (receiving) the circuit component 230, and thus an installation space for installing the stator 110 and the circuit component 230 can be reduced.

Further, by eliminating the need for a separate circuit component case for accommodating and mounting the circuit component 230, a fabricating time and a fabricating cost of the circuit component case can be reduced accordingly.

The case body 190 may be fabricated, for example, in an extruding manner.

This may facilitate the fabrication of the case body 190 and reduce the fabricating cost.

Brackets or case covers 270 and 290 (see FIG. 4) for blocking the stator accommodating space 201 and the cooling fluid flow path 220 of the case body 190 may be provided on both sides of the case body 190, respectively.

The case covers 270 and 290 may include a first case cover 270 and a second case cover 290 provided on both end portions of the case body 190, respectively, for example.

The first case cover 270, for the sake of explanation, may be disposed on a left side of the case body 190 and the second case cover 290 may be disposed on a right side in the drawing.

The first case cover 270 and the second case cover 290 may be provided with bearings 275 and 295, respectively, for rotatably supporting the rotating shaft 141.

Figure 3:
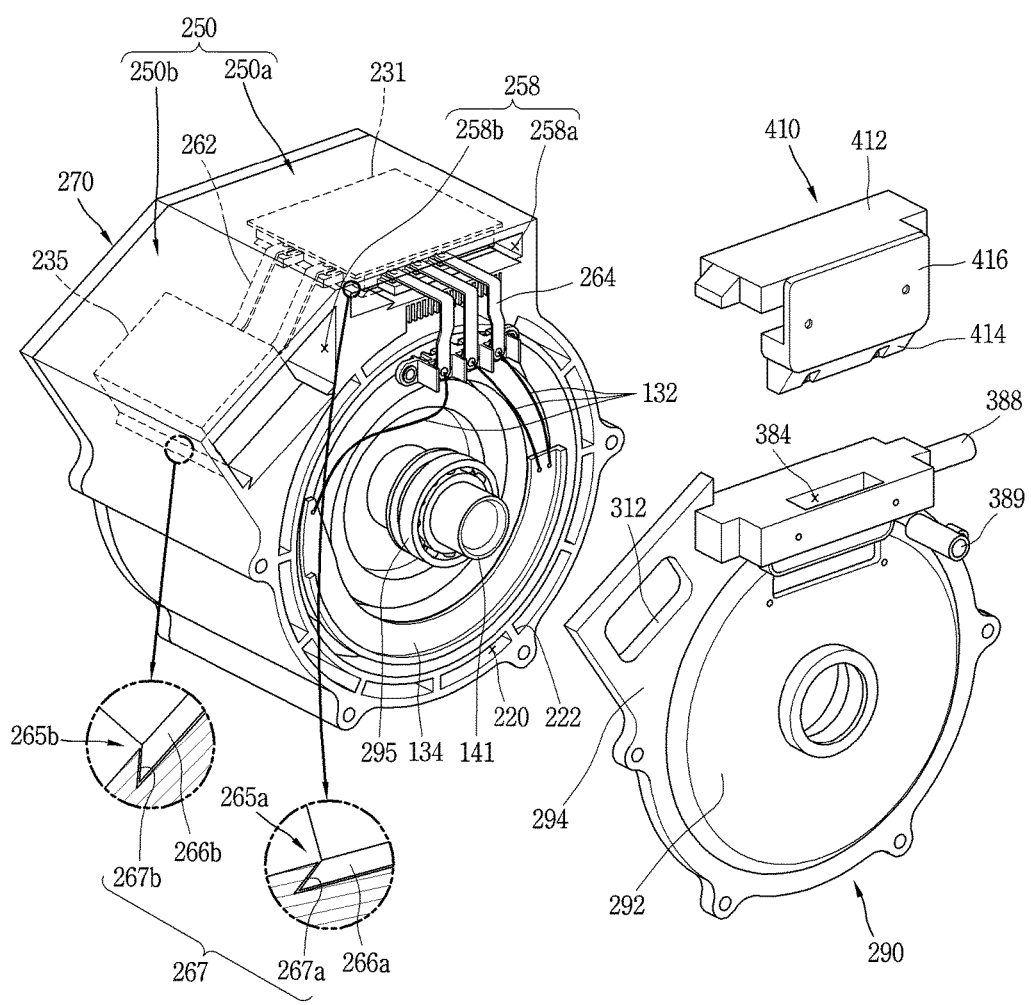
FIG. 3 is a perspective view illustrating a connected state of circuit components of FIG. 1.
Figure 4:
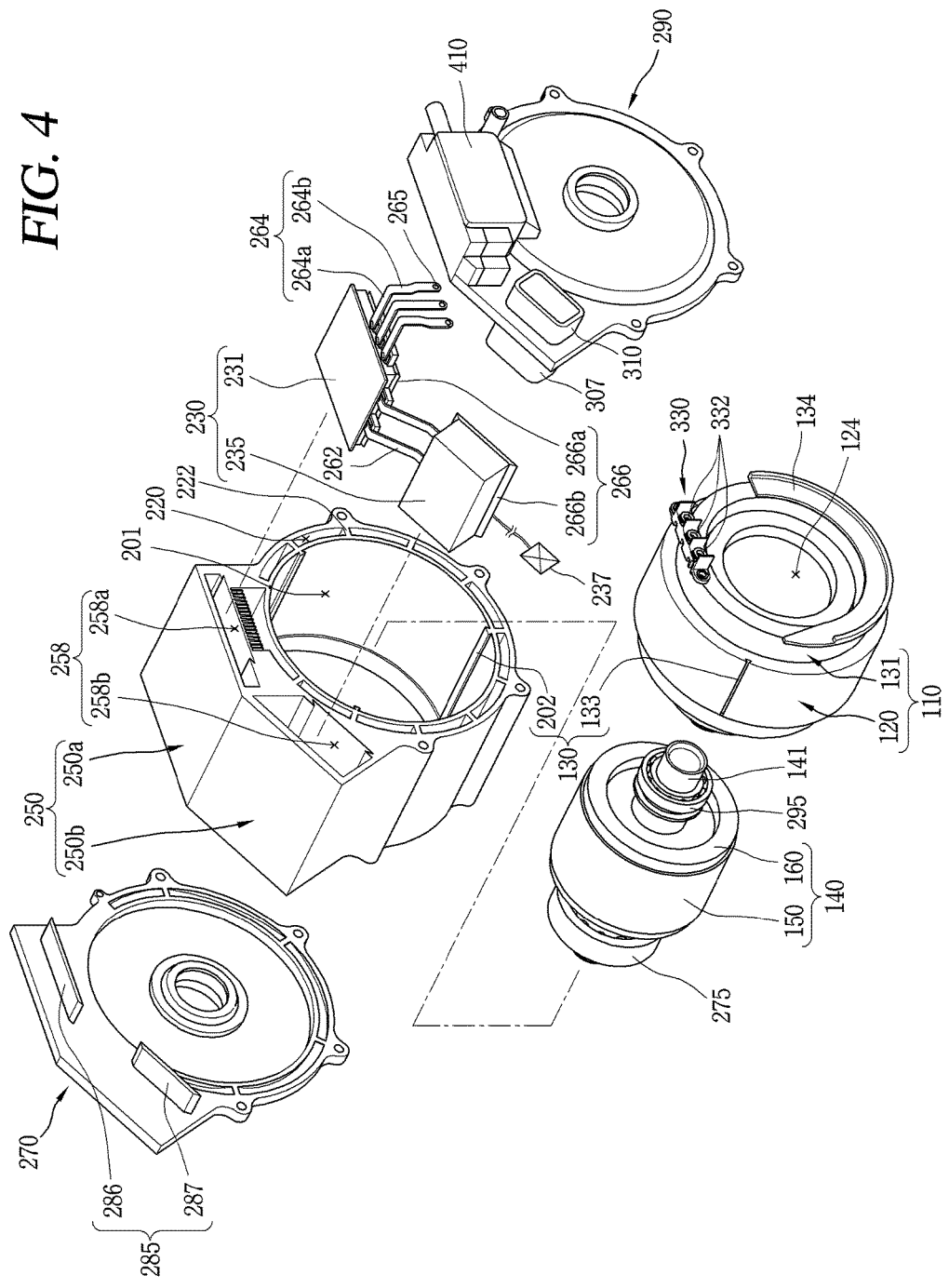
FIG. 4 is an exploded perspective view of the electric motor of FIG. 1.
Figure 5:
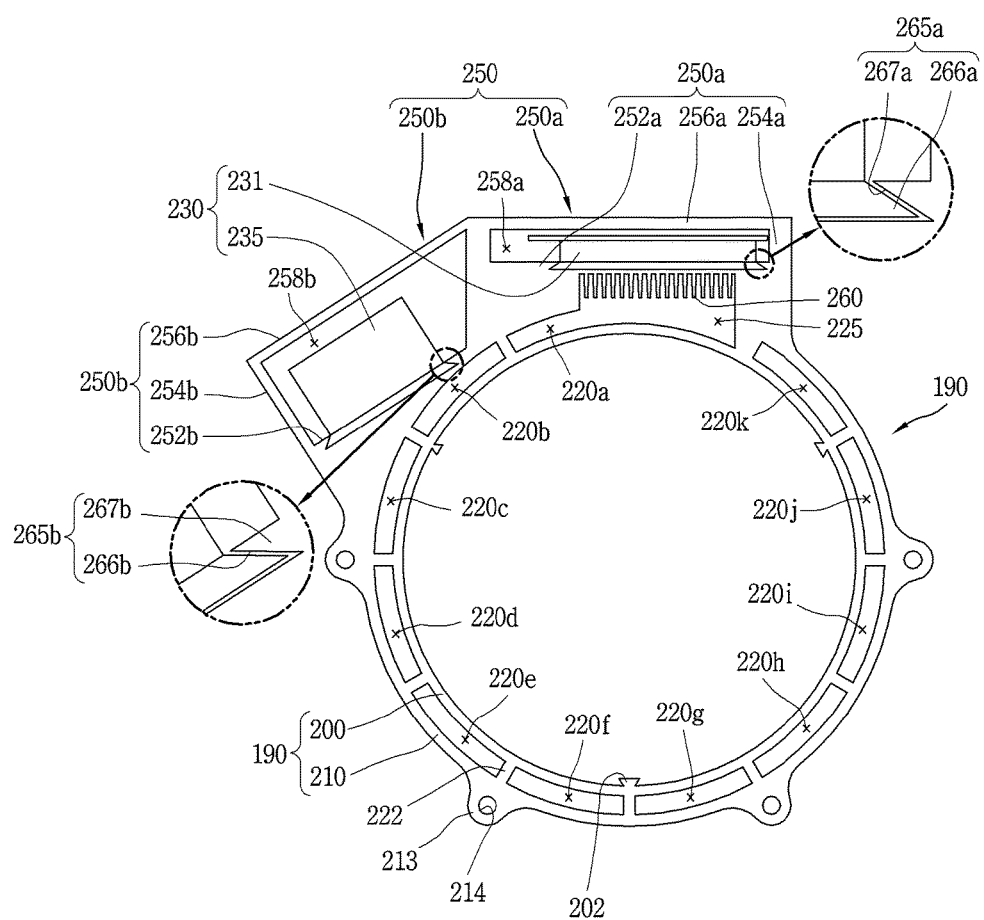
FIG. 5 is a sectional view of a case body of FIG. 4 illustrating an installed state of circuit components.

FIG. 3 is a perspective view illustrating a connected state of circuit components of FIG. 1, FIG. 4 is an exploded perspective view of the electric motor of FIG. 1, and FIG. 5 is a sectional view of a case body of FIG. 4 illustrating an installed state of circuit components.

As illustrated in FIG. 4, the stator 110 and the rotor 140 may be detachably received in the case body 190.

The case body 190 and the stator 110 may be provided with a stator vibration suppressing unit 130 detachably coupled with the stator 110 in the axial direction, and preventing a generation of vibration (clearance) of the stator 110.

The stator vibration suppressing unit 130, for example, may include a coupling protrusion 202 protruding from one of mutual contact surfaces of the inner case 200 and the stator core 120 toward the other, and a coupling protrusion receiving portion 133 formed on the other surface to receive the coupling protrusion 202 therein.

The coupling protrusion 202 may be formed on the case body 190, for example.

The coupling protrusion 202 may protrude from an inner surface of the inner case 200 of the case body 190 and extend along the axial direction.

The coupling protrusions 202 may be provided in plurality and spaced apart from one another in a circumferential direction of the inner case 200.

This embodiment exemplarily illustrates that the coupling protrusions 202 are three in number, but the number of the coupling protrusions 202 may be appropriately adjusted.

The coupling protrusion 202 may be configured such that its outer width gradually increases in its protruding direction, for example.

The coupling protrusion receiving portion 133 may be formed on the stator 110.

The coupling protrusion receiving portion 133 may be formed, for example, in a manner of being recessed into an outer surface of the stator core 120 in a radial direction and penetratingly formed to extend in the axial direction.

The coupling protrusion receiving portion 133 may be provided in plurality which are formed on the outer surface of the stator core 120 and spaced apart from one another in the circumferential direction.

With the configuration, the stator core 120 may be inserted into the inner case 200 in the axial direction in a state where the coupling protrusions 202 are inserted into the coupling protrusion receiving portions 133.

Accordingly, the stator 110 can be prevented from generating clearance with respect to the case body 190 during operation, and supported by the case body 190 to prevent the generation of vibration due to the clearance.

The circuit component 230 may include an inverter 231, for example.

The circuit component mounting portion 250 may include, for example, an inverter mounting portion 250a.

The circuit component 230 may include a capacitor 235 (a DC-link capacitor) that provides DC power to the inverter 231.

The capacitor 235 may be electrically connected to, for example, a battery 237 of the vehicle.

The circuit component mounting portion 250 may be provided with a capacitor mounting portion 250b in which the capacitor 235 is mounted.

The inverter mounting portion 250a may be provided on an upper side of the outer case 210 in an upwardly protruding manner, for example.

The inverter mounting portion 250a, for example, may include an inverter mounting surface 252a formed on the outer surface of the outer case 210, a side surface 254a protruding from at least one side portion of the inverter mounting surface 252a, and a ceiling surface 256a extending from the side surface 254a, such that an inverter mounting space 258a penetratingly formed in the axial direction is formed therein.

The capacitor mounting portion 250b may be provided at one side of the inverter mounting portion 250a.

The capacitor mounting portion 250b, for example, may include a capacitor mounting surface 252b on which the capacitor 235 is mounted, a side surface 254b protruding from at least one side portion of the capacitor mounting surface 250b, and a ceiling surface 256b extending from the side surface 254b, such that a capacitor mounting space 258b penetratingly formed in the axial direction is formed therein.

The capacitor mounting surface 252b and the inverter mounting surface 252a may be formed to be inclined with respect to each other, for example.

This embodiment exemplarily illustrates that the inverter mounting surface 252a is horizontally disposed in the drawing and the capacitor mounting surface 252b is inclined. However, this is merely illustrative. Alternatively, the capacitor mounting surface 252b may be disposed horizontally in the drawing and the inverter mounting surface 252a may be disposed to be inclined.

A capacitor cover 310 may be provided on one end portion of the capacitor mounting portion 250b to be connected to a power source (for example, the battery 237).

The capacitor 235 and the inverter 231 may be electrically connected to each other by a DC bus bar 262.

The DC bus bar 262 may be configured as, for example, a pair of (two) conductors spaced apart from each other.

An AC bus bar 264 through which three-phase AC power is output may be provided on one end portion of the inverter 231.

The AC bus bar 264 may be configured as, for example, three conductors spaced apart from one another.

One end of the AC bus bar 264 may be connected to the inverter 231 and the other end may be connected to a terminal block 330.

The AC bus bar 264 may include a horizontal portion 264a extending in the axial direction and a perpendicular portion 264b bent at an almost right angle with respect to the horizontal portion 264a.

The terminal block 330 may be provided on the second case cover 290 (see FIG. 14), for example.

The terminal block 330 may be connected with another end of each of the power lines 132 with one end connected to the connection ring 134.

The power lines 132 may be configured as three power lines to be connected to each phase coil (a first phase coil (U phase coil), a second phase coil (V phase coil) and a third phase coil (W phase coil)) of the stator coil 131, respectively.

Figure 6:
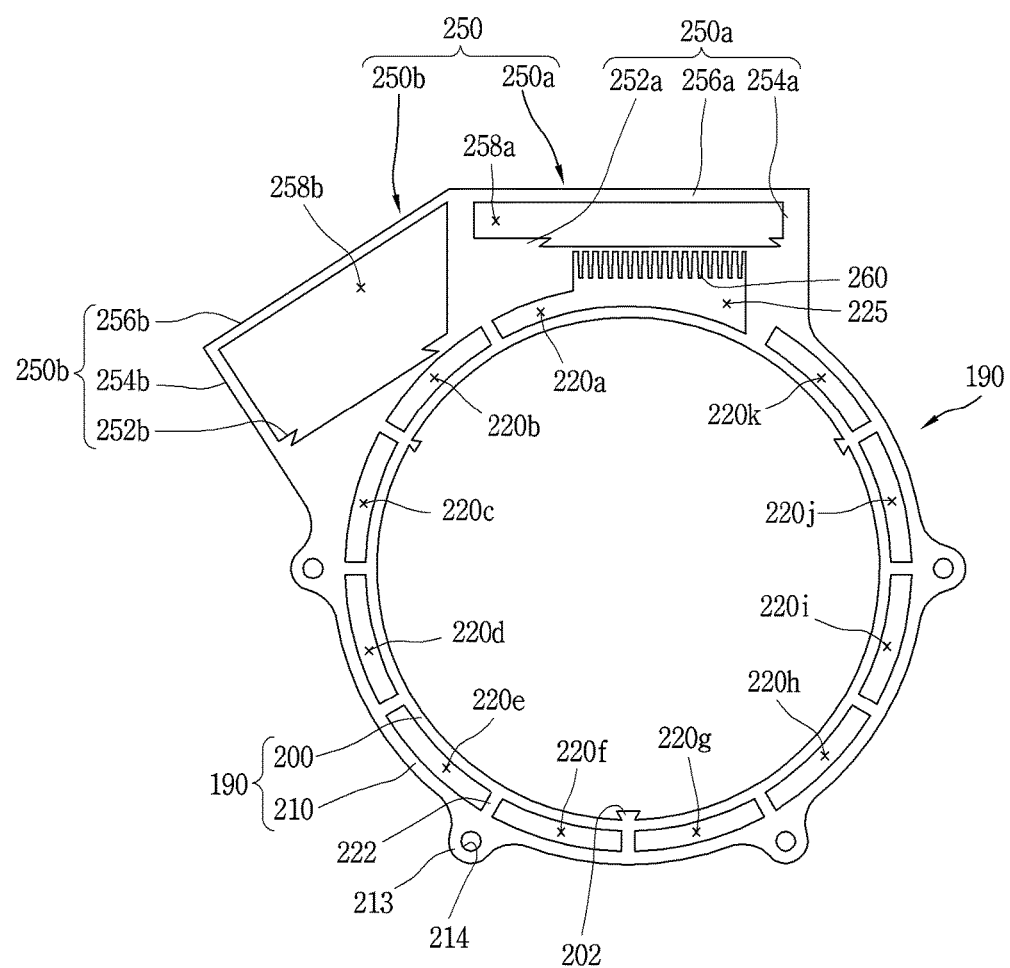
FIG. 6 is a sectional view of the case body of FIG. 4.
Figure 7:
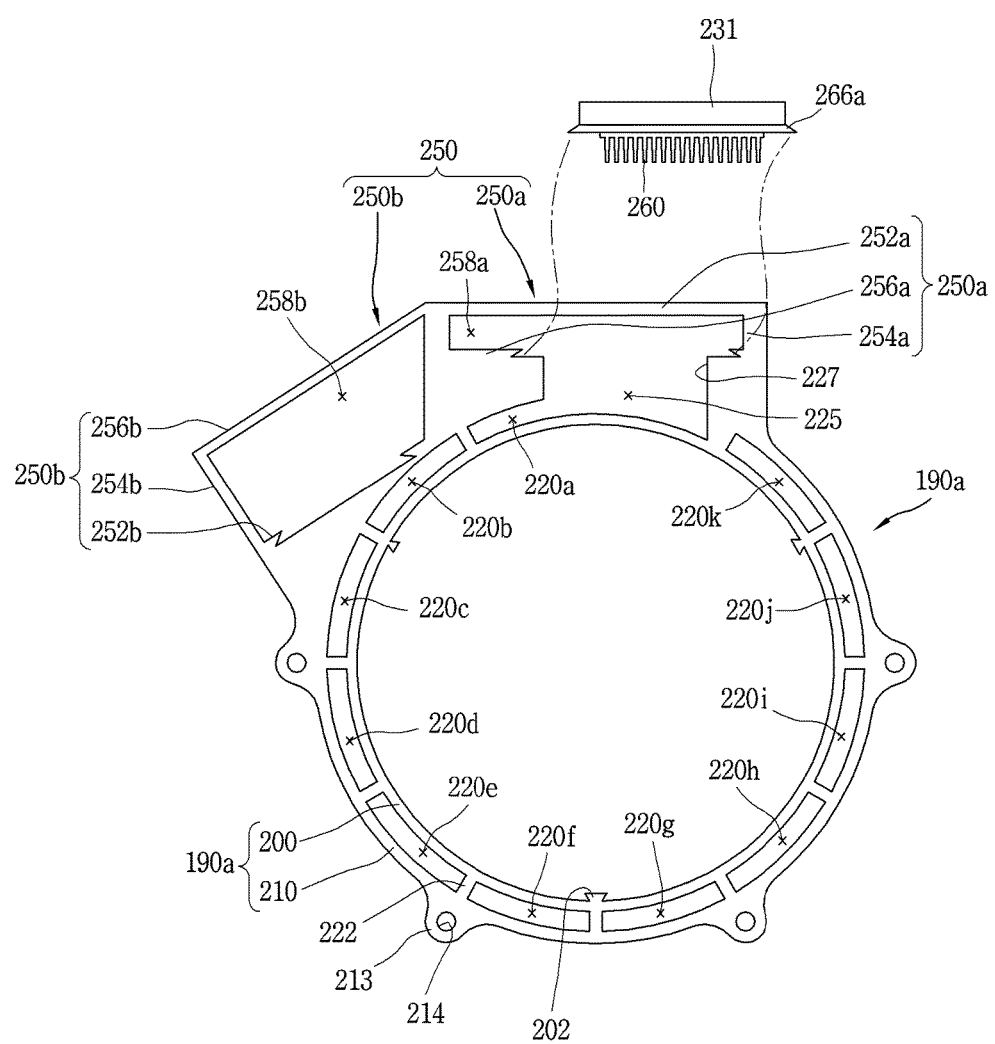
FIG. 7 is a view illustrating a variation of the case body of FIG. 6.
Figure 8:
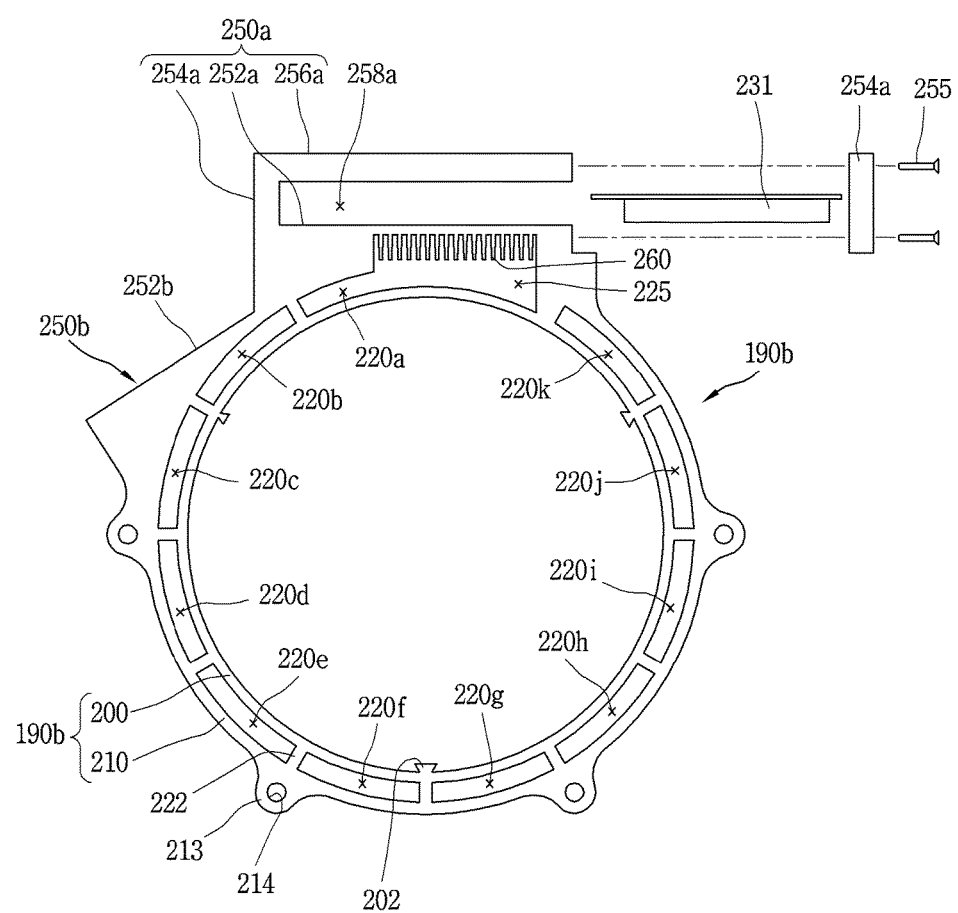
FIG. 8 is a view illustrating another variation of the case body of FIG. 6.
Figure 9:
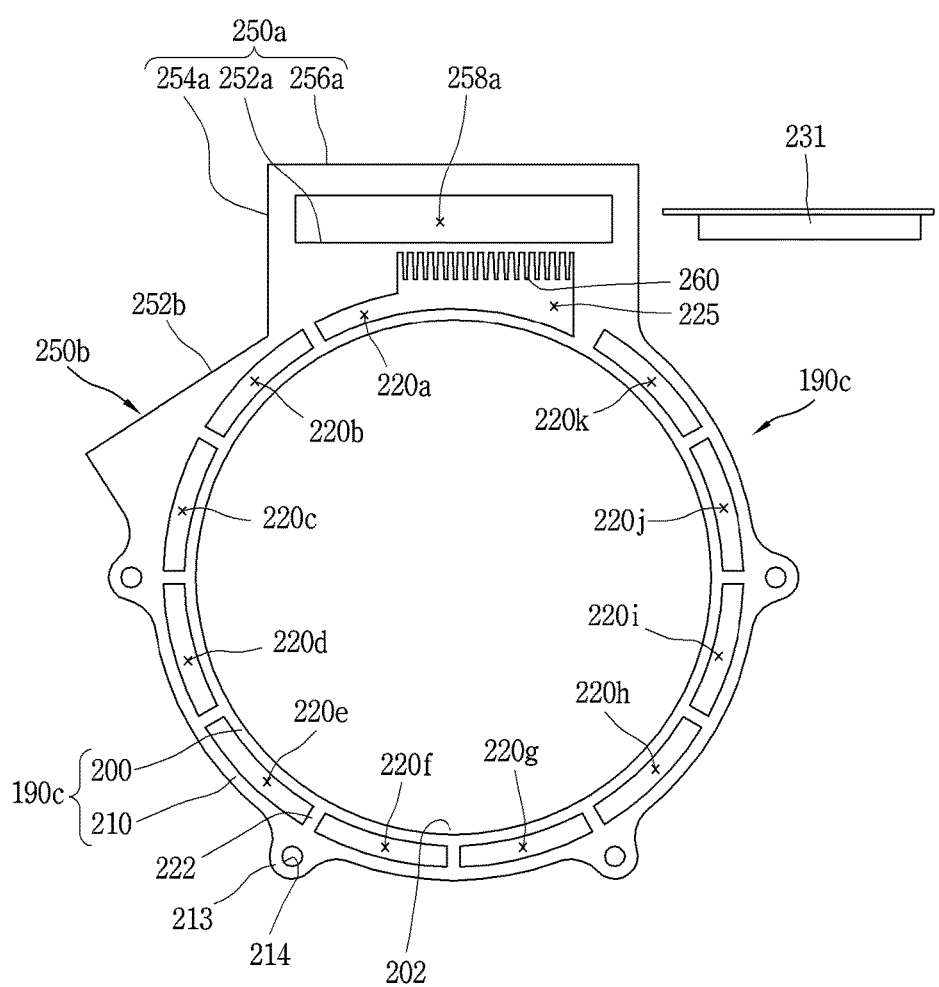
FIG. 9 is a view illustrating another variation of the case body of FIG. 6.

FIG. 6 is a sectional view of the case body of FIG. 4, FIG. 7 is a variation of the case body of FIG. 6, FIG. 8 is another variation of the case body of FIG. 6, and FIG. 9 is another variation of the case body of FIG. 6.

As illustrated in FIG. 6, the inner case 200 and the outer case 210 of the case body 190 may be disposed concentrically with each other.

The outer case 210 may have an inner diameter larger than an outer diameter of the inner case 200.

Accordingly, the cooling fluid flow path 220 may be formed between the inner case 200 and the outer case 210.

The outer case 210 may be provided with a plurality of coupling portions 213 so that the case covers 270 and 290 can be coupled by a plurality of coupling members.

Each of the plurality of coupling portions 213 may be formed in a manner of being outwardly protruded from the outer surface of the outer case 210 in the radial direction and extending in the axial direction.

The plurality of coupling portions 213 may be spaced apart from one another in the circumferential direction of the outer case 210.

The plurality of coupling portions 213 may be provided with insertion holes 214, respectively, in which a plurality of coupling members coupled through the case covers 270 and 290 are inserted, respectively.

A plurality of barrier walls 222 each having one end connected to the inner case 200 and another end connected to the outer case 210 may be provided between the outer case 210 and the inner case 200.

The barrier walls 222 may be configured to have the same length as the inner case 200 and the outer case 210, for example.

The barrier walls 222 may be provided in plurality spaced apart from one another in the circumferential direction of the inner case 200.

Accordingly, a plurality of partial flow paths 220a to 220k may be formed along the circumferential direction of the inner case 200 in a manner of partitioning the cooling fluid flow path 220 into a plurality of paths.

This embodiment exemplarily illustrates that the partial flow paths of the case body 190 include the first partial flow path 220a to the eleventh partial flow path 220k, but the number of the partial flow paths may be appropriately adjusted.

The plurality of partial flow paths 220a to 220k may communicate with each other by a flow path communicating unit 280 (see FIG. 2) formed in the case covers 270 and 290.

The flow path communicating unit 280 may be configured to communicate two partial flow paths adjacent to each other along the circumferential direction of the inner case 200, for example.

The inverter mounting space 258a having an approximately rectangular cross-sectional shape may be formed through the inverter mounting portion 250a.

The inverter mounting portion 250a may be provided with a plurality of cooling fins 260 that are brought into contact with the cooling fluid.

The plurality of cooling fins 260 may be formed between the inverter mounting surface 252a of the inverter mounting portion 250a and the inner case 200.

The plurality of cooling fins 260 may protrude from the inverter mounting surface 252a toward the inner case 200.

The plurality of cooling fins 260 may protrude from the inverter mounting surface 252a and extend in the axial direction, respectively, for example.

The plurality of cooling fins 260 may be spaced apart from one another in a direction perpendicular to the axial direction, for example.

The cooling fluid flow path 220 may include a flow path extending portion 225 extending toward the inverter mounting portion 250a.

The plurality of cooling fins 260 may be provided inside the flow path extending portion 225.

With this configuration, the plurality of cooling fins 260 can be brought into contact with the cooling fluid within the flow path extending portion 225.

Accordingly, the inverter mounting portion 250a (the inverter mounting surface 252a, the inverter 231, and the inverter mounting space 258a) can be quickly cooled.

The circuit component vibration suppressing unit for preventing a generation of vibration of the circuit component 230 may be provided between the circuit component mounting portion 250 (the inverter mounting portion 250a and the capacitor mounting portion 250b) and the circuit component 230 (the inverter 231 and the capacitor 235).

The circuit component vibration suppressing unit may include a coupling protrusion 266 (see FIG. 4) protruding from one of the circuit component 230 and the circuit component mounting portion 250, and a coupling protrusion receiving portion 267 (see FIG. 3) formed on the other of the circuit component 230 and the circuit component mounting portion 250 to receive the coupling protrusion 266.

The coupling protrusion 266 may have a cross-sectional shape with an outer width gradually increasing along a protruding direction, for example.

The coupling protrusion receiving portion 267 may have a cross-sectional shape with an increased inner width in a recessed direction to correspond to the shape of the coupling protrusion 266, for example.

With this configuration, when the coupling protrusion 266 is received in the coupling protrusion receiving portion 267, the coupling protrusion 266 can be moved merely along the axial direction within the coupling protrusion receiving portion 267, while a displacement of the coupling protrusion 266 can be prevented in a direction different from the axial direction.

More specifically, for example, the circuit component vibration suppressing unit may include an inverter vibration suppressing portion 265a formed between the inverter mounting portion 250a and the inverter 231.

The inverter vibration suppressing portion 265a may include a coupling protrusion 266a formed on the inverter 231, and a coupling protrusion receiving portion 267a formed on the inverter mounting portion 250a.

The circuit component vibration suppressing unit may include a capacitor vibration suppressing portion 265b formed between the capacitor mounting portion 250b and the capacitor 235.

The capacitor vibration suppressing portion 265b may include a coupling protrusion 266b formed on the capacitor 235, and a coupling protrusion receiving portion 267b formed on the capacitor mounting portion 250b.

Referring now to FIG. 7, a case body 190a may be configured such that the inverter mounting space 258a of the inverter mounting portion 250a and the flow path extending portion 225 communicate with each other.

A communication hole 227 communicating with the flow path extending portion 225 may be formed in the inverter mounting surface 252a.

More specifically, the inverter 231 may be provided with the plurality of cooling fins 260, and the communication hole 227 may be blocked by the plurality of cooling fins 260 provided on the inverter 231. Thus, the inverter mounting space 258a and the flow path extending portion 225 may be partitioned from each other.

The inverter mounting space 258a and the flow path extending portion 225 may be configured so that an introduction of the cooling fluid into the inverter mounting space 258a is blocked (prevented) by the inverter 231.

Accordingly, the inverter 231 and an electric circuit can be protected from the cooling fluid.

Referring now to FIG. 8, a case body 190b may be configured to have a rectangular cross-section in which one side surface of the inverter mounting portion 250a is removed.

A side wall portion 254a corresponding to one removed side surface of the inverter mounting portion 250a may be provided at one side (end portion) of the inverter 231.

The side wall portion 254a and the inverter 231 may be integrally coupled to each other, for example.

The side wall portion 254a may be integrally fixed to the inverter mounting portion 250a by a plurality of coupling members 255 while the inverter 231 is inserted into the inverter mounting portion 250a.

Referring now to FIG. 9, a case body 190c may include an inverter mounting portion 250a having an inverter accommodating space 258a penetratingly formed therein in the axial direction and having a rectangular cross-sectional shape, a plurality of cooling fins 260, and a flow path extending portion 225, and may exclude the aforementioned circuit component vibration suppressing unit.

The capacitor mounting portion 250b having the capacitor mounting surface 252b protruding from the outer case 210 and having a rectangular shape may be provided on one side of the inverter mounting portion 250a.

Figure 10:
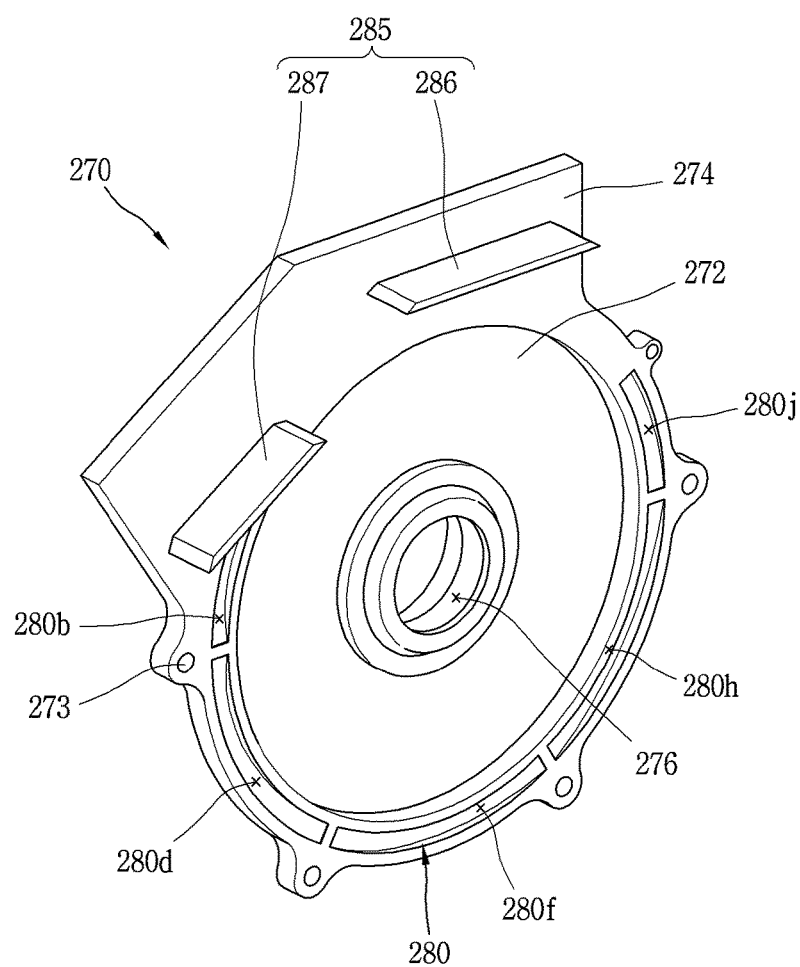
FIG. 10 is an enlarged view of a first case cover of FIG. 4.

FIG. 10 is an enlarged view of the first case cover of FIG. 4.

As illustrated in FIG. 10, the first case cover 270 may be configured to open and close one end portion of the case body 190.

The first case cover 270 may be configured to open and close a left end portion of the case body 190, for example, as illustrated in the drawing.

The first case cover 270 may include a first blocking part 272 for blocking the accommodating space of the stator 110 and the cooling fluid flow path 220, and a second blocking part 274 protruding from the first blocking part 272 to block the mounting space of the circuit component 230.

The first case cover 270 may be provided with a bearing receiving portion 276 in which a bearing 275 is inserted.

Insertion holes 273 may be formed through an edge portion of the first case cover 270 to correspond to the insertion holes 214 of the case body 190.

The first blocking part 272 of the first case cover 270 may be provided therein with a flow path communicating unit 280 for blocking the cooling fluid flow path 220 and simultaneously communicating the adjacent partial flow paths with each other.

The flow path communicating unit 280 may be provided, for example, in plurality in a manner of being recessed into the first case cover 270 in a thickness direction and spaced apart from one another in a circumferential direction.

The flow path communicating unit 280 of the first case cover 270 may be provided with a second flow path communicating portion 280b, a fourth flow path communicating portion 280d, a sixth flow path communicating portion 280f, an eighth flow path communicating portion 280h, and a tenth flow path communicating portion 280j.

The second flow path communicating portion 280b may be configured to communicate the second partial flow path 220b with the third partial flow path 220c, for example.

The fourth flow path communicating portion 280d may be configured to communicate the fourth partial flow path 220d with the fifth partial flow path 220e, for example.

The sixth flow path communicating portion 280f may be configured to communicate the sixth partial flow path 220f with the seventh partial flow path 220g, for example.

The eighth flow path communicating portion 280h may be configured to communicate the eighth partial flow path 220h with the ninth partial flow path 220i, for example.

The tenth flow path communicating portion 280j may be configured to communicate the tenth partial flow path 220j with the eleventh partial flow path 220k, for example.

The first case cover 270 may be provided with a circuit component supporting unit 285 for supporting the circuit component 230 in the axial direction.

The circuit component supporting unit 285 may include an inverter supporting portion 286 brought into contact with the inverter 231 for supporting the inverter 231, for example.

The inverter supporting portion 286 may protrude from an inner surface of the first case cover 270 to be insertable into the coupling protrusion receiving portion 267a, for example.

The inverter supporting portion 286 may be inserted into the coupling protrusion receiving portion 267a and brought into contact with the coupling protrusion 266a of the inverter 231 to restrict an axial movement of the inverter 231.

The circuit component supporting unit 285 may be provided with a capacitor supporting portion 287 brought into contact with the capacitor 235 for supporting the capacitor 235, for example.

The capacitor supporting portion 287 may protrude from the inner surface of the first case cover 270 to be insertable into the coupling protrusion receiving portion 267b.

The capacitor supporting portion 287 may be inserted into the coupling protrusion receiving portion 267b and brought into contact with the coupling protrusion 266b of the capacitor 235 to restrict an axial movement of the capacitor 235.

Figure 11:
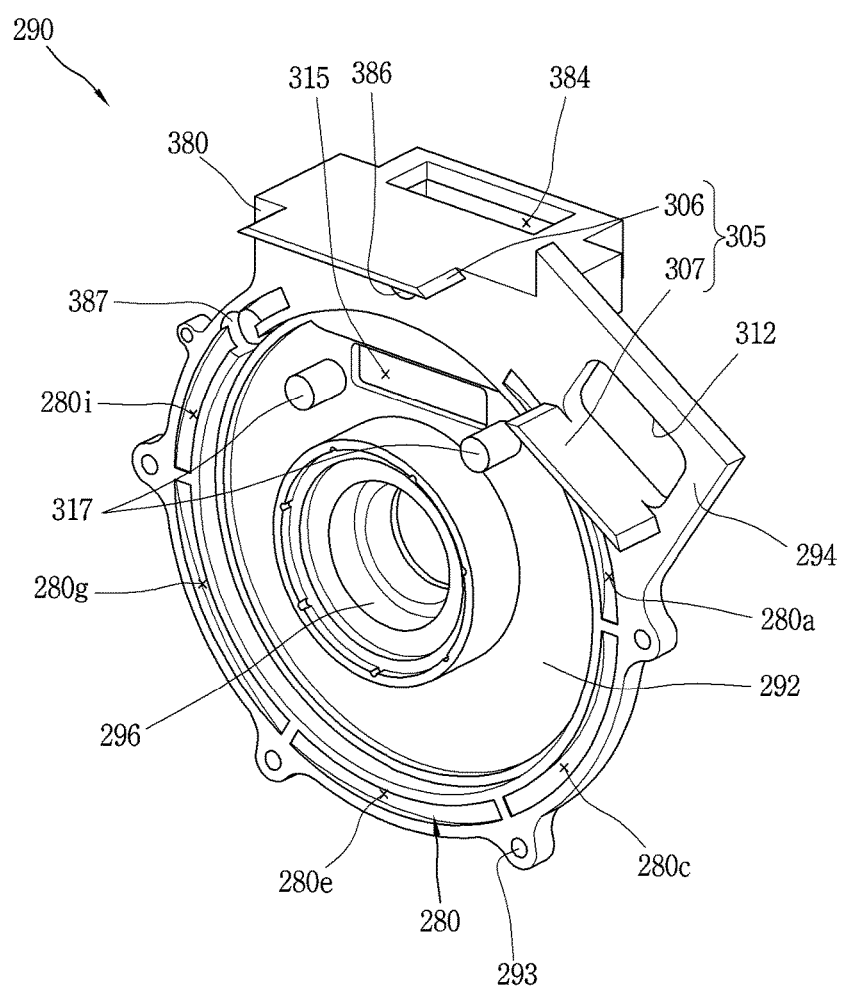
FIG. 11 is a perspective view illustrating an inside of a second case cover of FIG. 4.
Figure 12:
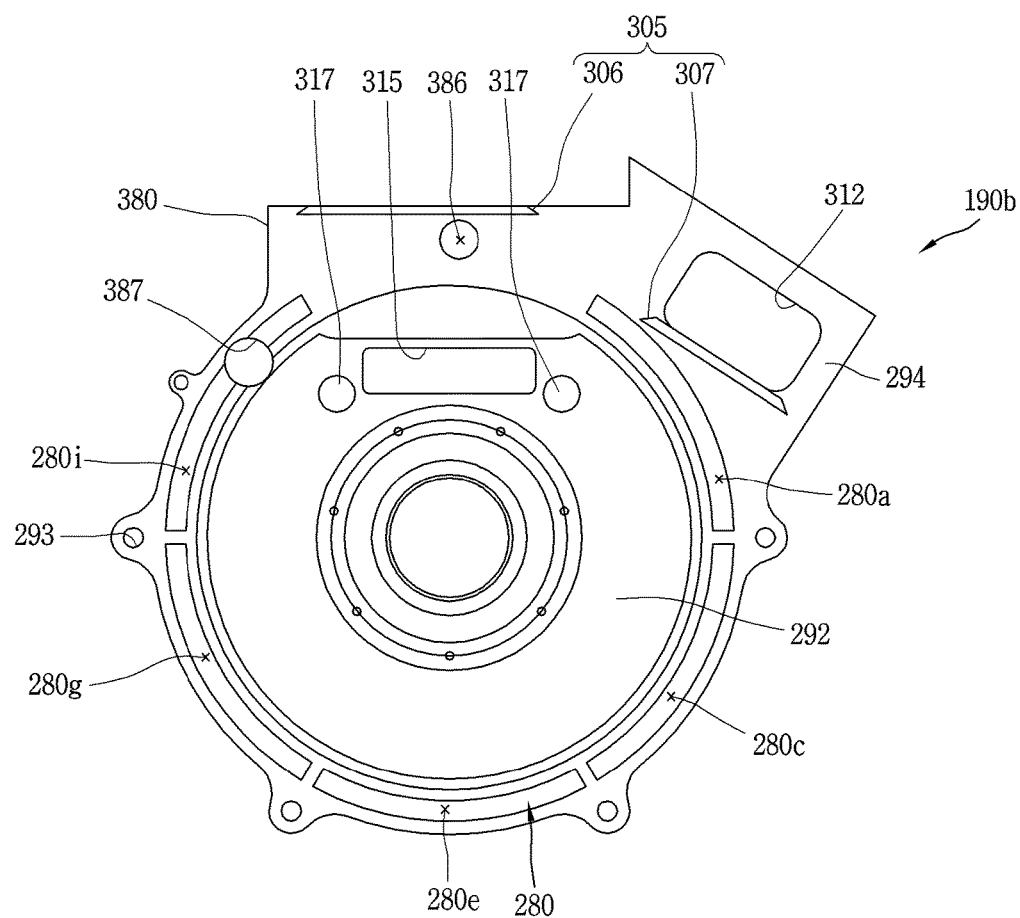
FIG. 12 is an inner view of the second case cover of FIG. 11.
Figure 13:
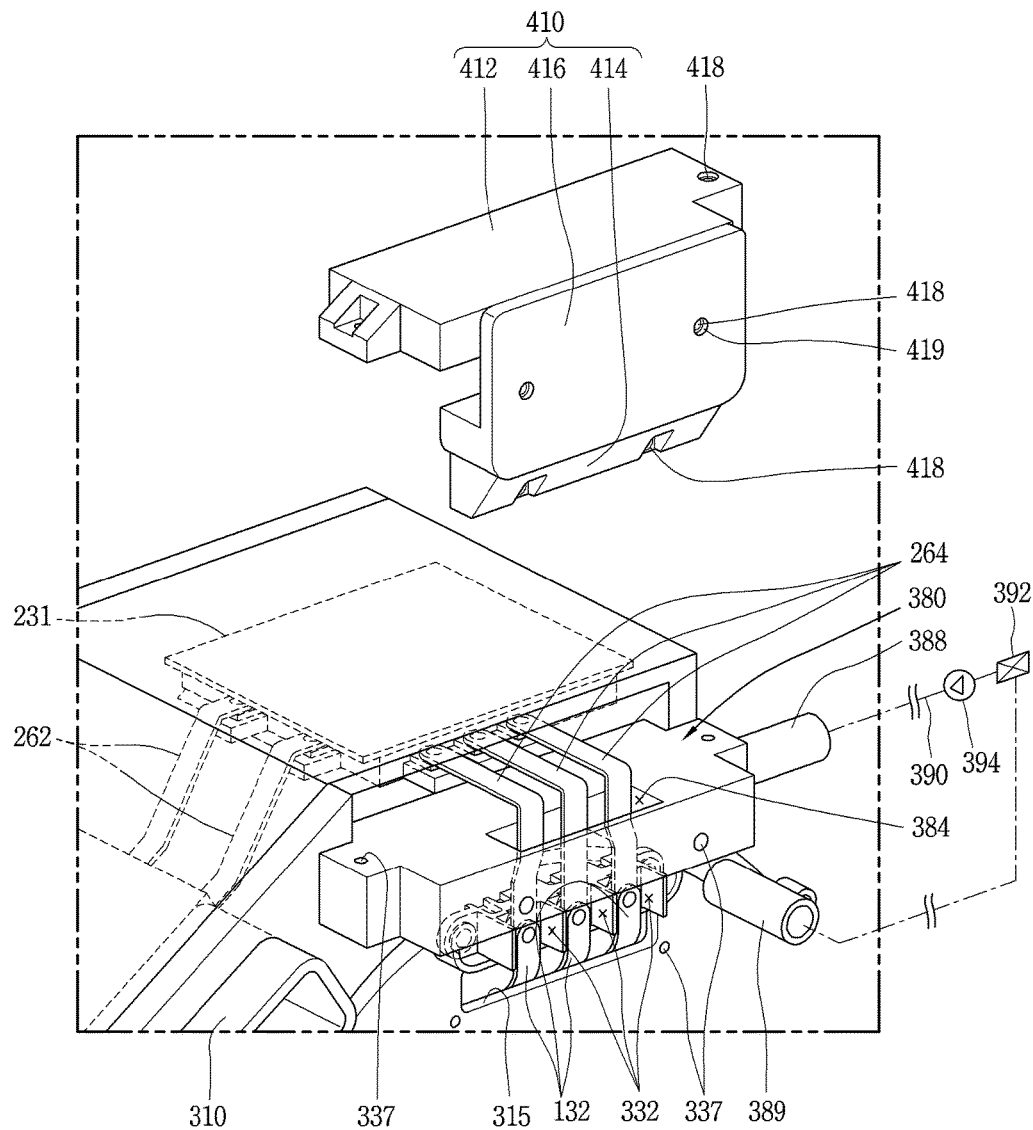
FIG. 13 is a perspective view of an AC bus area excluding a circuit component cover of FIG. 1.
Figure 14:
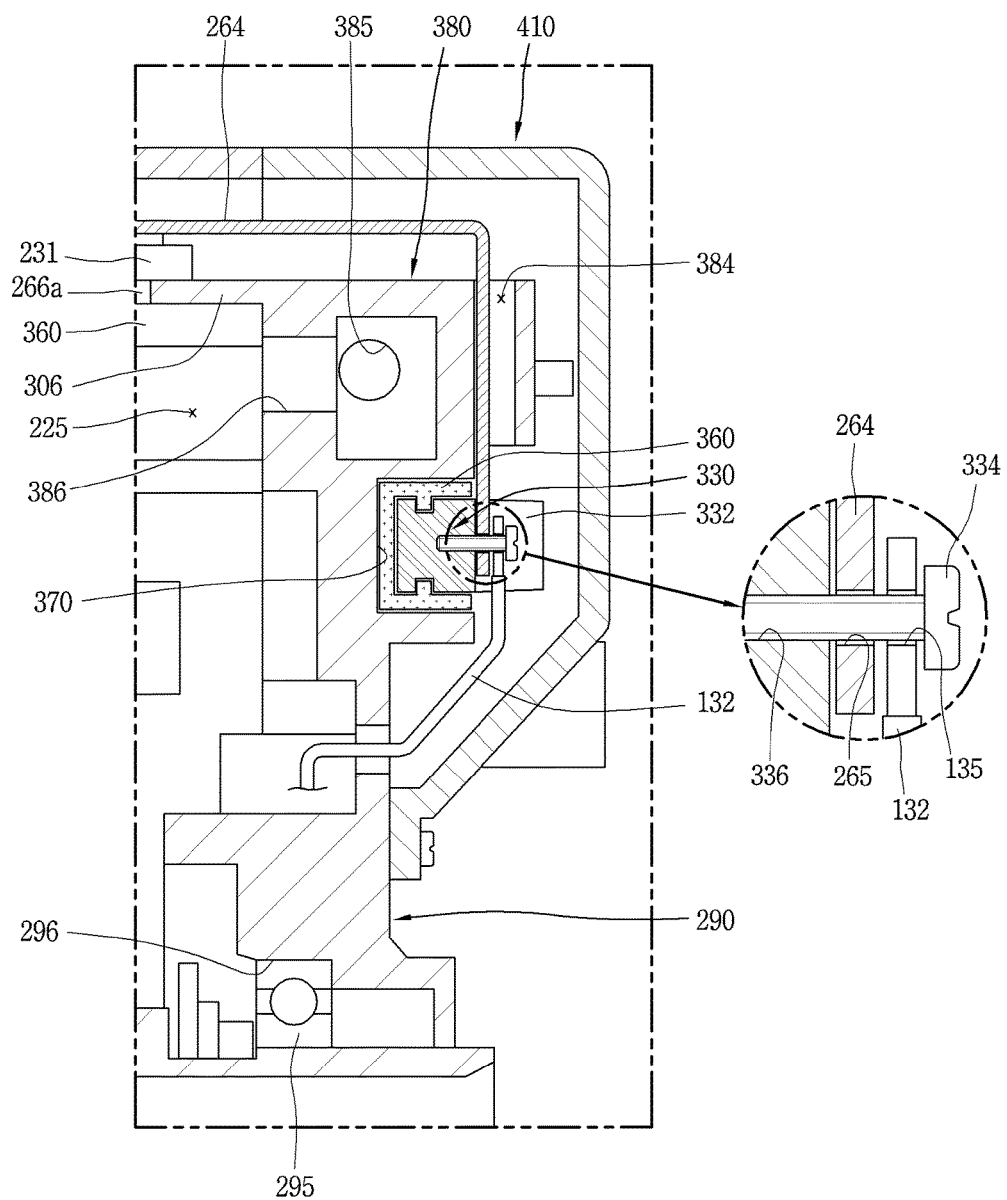
FIG. 14 is an enlarged sectional view of a terminal block area of FIG. 13.

FIG. 11 is a perspective view illustrating an inside of the second case cover of FIG. 4, FIG. 12 is an inner view of the second case cover of FIG. 11, FIG. 13 is a perspective view illustrating an AC bus area excluding a circuit component cover of FIG. 1, and FIG. 14 is an enlarged sectional view of a terminal block area of FIG. 13.

The second case cover 290 may be configured to block one end portion (for example, a right end portion in the drawing) of the case body 190.

More specifically, the second case cover 290 may include a first blocking part 292 for blocking the stator accommodating space 201 and the cooling fluid flow path 220, and a second blocking part 294 for blocking the circuit component mounting space.

The second case cover 290 may be provided with a bearing receiving portion 296 in which the bearing 295 is inserted.

Insertion holes 293 may be formed through an edge of the second case cover 290 to correspond to the insertion holes 214 of the case body 190.

A flow path communicating unit 280 for communicating the partial flow paths of the cooling fluid may be formed on an inner surface of the second case cover 290.

The flow path communicating unit 280 may be recessed along the thickness direction of the second case cover 290, for example.

The flow path communicating unit 280 of the second case cover 290 may be provided with a first flow path communicating portion 280a, a third flow path communicating portion 280c, a fifth flow path communicating portion 280e, a seventh flow path communicating portion 280g, and a ninth flow path communicating portion 280i.

The first flow path communicating portion 280a may be configured to communicate the first partial flow path 220a with the second partial flow path 220b, for example.

The third flow path communicating portion 280c may be configured to communicate the third partial flow path 220c with the fourth partial flow path 220d, for example.

The fifth flow path communicating portion 280e may be configured to communicate the fifth partial flow path 220e with the sixth partial flow path 220f, for example.

The seventh flow path communicating portion 280g may be configured to communicate the seventh partial flow path 220g with the eighth partial flow path 220h, for example.

The ninth flow path communicating portion 280i may be configured to communicate the ninth partial flow path 220i with the tenth partial flow path 220j, for example.

The second case cover 290 may be provided with a circuit component supporting unit 305 for supporting the circuit component 230 in the axial direction.

The circuit component supporting unit 305 may be provided with an inverter supporting portion 306 for supporting the inverter 231.

The circuit component supporting unit 305 may be provided with a capacitor supporting portion 307 for supporting the capacitor 235.

The inverter supporting portion 306 and the capacitor supporting portion 307 of the second case cover 290 may protrude from the inner surface of the second case cover 290 to be inserted into the coupling protrusion receiving portions 267a and 267b, respectively.

The inverter supporting portion 306 and the capacitor supporting portion 307 of the second case cover 290 may be inserted into the coupling protrusion receiving portions 267a and 267b to be brought into contact with the coupling protrusions 266a and 266b, respectively, thereby supporting the inverter 231 and the capacitor 235 in a manner of restricting the axial movements of the inverter 231 and the capacitor 235.

The capacitor cover 310 (see FIG. 1) communicating with the capacitor mounting portion 250b may be provided on one side (upper side in the drawing) of the capacitor supporting portion 307, for example.

The second blocking part 294 of the second case cover 290 may be provided with a coupling hole 312 through which the capacitor cover 310 is inserted.

The second case cover 290 may be provided with a power line draw-out hole 315 formed therethrough so that the power lines 132 extending from the stator coil 131 are drawn out.

The second case cover 290 may be provided with a power line supporter 317 to support the power line 132.

The power line supporter 317 may be provided in plurality, for example.

The power line supporters 317 may protrude from an inner surface of the second case cover 290, for example.

The power line supporter 317 may be implemented, for example, in a shape of a circular cylinder.

The second case cover 290 may be provided with a terminal block 330.

The terminal block 330 may be provided on an outer surface of the second case cover 290.

The terminal block 330 may be provided on an upper side of the draw-out hole 315, for example.

The terminal block 330, for example, may be provided with three terminal accommodating portions 332.

The AC bus bar 264 extending from the inverter 231 and the power lines 132 may be connected to the three terminal accommodating portions 332 for each phase.

Coupling member inserting holes 265 and 135 may be formed through end portions of the AC bus bar 264 and the power line 132, respectively, so that a coupling member 334 can be inserted.

Each of the three terminal accommodating portions 332 may be provided with a female threaded portion 336 in which the coupling member 334 inserted through each of the coupling member inserting holes 265 and 135 of the AC bus bar 264 and the power line 132, respectively, is screwed.

A terminal block cooling portion 380 may be formed on the second case cover 290 to cool the terminal block 330.

A heat transfer member 360 for transferring heat of the terminal block 330 to the terminal block cooling portion 380 may be provided between the terminal block 330 and the terminal block cooling portion 380 (see FIG. 14).

The heat transfer member 360 may be made of, for example, thermal conductive plastic.

The heat transfer member 360 may surround an outer surface of the terminal block 330, for example.

The heat transfer member 360 may be inserted into a recess portion 370 formed in the second case cover 290 in a recessed manner, for example.

Accordingly, a heat exchange area between the heat transfer member 360 and the second case cover 290 may increase, so that the heat of the terminal block 330 can be quickly transferred to the terminal block cooling portion 380.

The terminal block cooling portion 380 may be provided on the outer surface of the second case cover 290, for example.

The terminal block cooling portion 380 may be provided at an upper side of the terminal block 330 on the outer surface of the second case cover 290, for example.

The terminal block cooling portion 380 may be provided adjacent to the circuit component mounting unit 250, for example.

More specifically, the terminal block cooling portion 380 may be provided adjacent to the inverter mounting portion 250a.

The terminal block cooling portion 380 may be implemented, for example, in an approximately rectangular parallelepiped shape.

A bus bar accommodating portion 384 in which the AC bus bar 264 is accommodated may be formed at an outside (see FIG. 14) of the terminal block cooling portion 380, for example.

The terminal block cooling portion 380, for example, may be provided with a cooling fluid inlet portion 385 through which the cooling fluid is introduced.

The cooling fluid inlet portion 385, for example, may be formed through one end portion of the terminal block cooling portion 380 in a lengthwise direction of the terminal block cooling portion 380.

A cooling fluid inlet pipe 388 along which the cooling fluid flows may be inserted into the cooling fluid inlet portion 385.

The cooling fluid inlet pipe 388 may be connected to a cooling heat exchanger 392 (for example, a radiator of a vehicle) along which the cooling fluid circulates so as to be cooled.

The cooling fluid introduction pipe 388 may be provided with a cooling fluid circulating pump 394 for circulating the cooling fluid.

A communication portion 386 may be provided at another side of the terminal block cooling portion 380 to allow the cooling fluid introduced into the terminal block cooling portion 380 to be combined with the cooling fluid of the case body 190.

The communication portion 386 may be formed through the inner surface of the second case cover 290, for example.

The communication portion 386 may be formed to communicate with the first partial flow path 220a (flow path extending portion 225) of the cooling fluid, formed below the inverter mounting portion 250a.

Accordingly, a cooling fluid having a relatively low temperature is introduced through the cooling fluid inlet portion 385 to cool the terminal block 330, and then is introduced into the first partial flow path 220a (the flow path expanding portion 225) below the inverter mounting portion 250a to cool the inverter 231.

The second case cover 290 may be provided with a cooling fluid outlet portion 387 through which the cooling fluid passing through the cooling fluid flow path 220 of the case body 190 is discharged.

The cooling fluid outlet portion 387 may be formed, for example, adjacent to the terminal block 330.

The cooling fluid outlet portion 387 may be configured to communicate with the eleventh partial flow path 220k in the latest order, for example, when the cooling fluid moved generally counterclockwise along the circumference of the case body 190.

A cooling fluid outlet pipe 389 may be coupled to the cooling fluid outlet portion 387.

The second case cover 290 may be provided with a circuit component cover 410 that covers the AC bus bar 264 and the terminal block 330.

As illustrated in FIGS. 13 and 14, the circuit component cover 410 may include, for example, an upper blocking part 412 blocking an upper area of the terminal block cooling portion 380, and a lower blocking part 414 blocking the terminal body 330.

The circuit component cover 410 may include a connecting portion 416 for integrally connecting the upper blocking part 412 and the lower blocking part 414.

The circuit component cover 410 may be detachably coupled to the second case cover 290.

The circuit component cover 410 may be provided with coupling portions 418 in which coupling members coupled to the second case cover 290 are inserted.

The coupling portions 418 of the circuit component cover 410 may be formed such that male screw portions of the coupling members are inserted therethrough.

Each of the coupling portions 418 of the circuit component cover 410 may be provided with a head receiving portion 419 formed in a recessing manner to receive a head portion of the coupling member, for example.

The second case cover 290 may be formed with female threaded portions 337 in which the coupling members inserted through the coupling portions 418 are screwed.

Positions and number of the coupling portions 418 of the circuit component cover 410 may be appropriately adjusted.

With the configuration, the stator 110 may be accommodated in the case body 190 and the rotor 140 may be received in the stator 110.

The capacitor 235 may be mounted in the capacitor mounting portion 250b and the inverter 231 may be mounted in the inverter mounting portion 250a.

The capacitor and the inverter 231 may be connected by the DC bus bar 262.

The first case cover 270 and the second case cover 290 may be coupled to both end portions of the case body 190, respectively.

One end of the AC bus bar 264 may be connected to the inverter 231 and another end of the AC bus bar 264 may be connected to the terminal block 330.

The AC bus bar 264 and the terminal block 330 may be protected by the circuit component cover 410.

The capacitor 235 may be connected to the battery 237 of the vehicle to receive power.

The cooling fluid inlet portion 385 and the cooling fluid outlet portion 387 may be connected to communicate with a cooling fluid circuit 390 of the vehicle, respectively.

When an operation is started, the rotor 140 may be rotated centering on the rotating axis 141.

As an operating time elapses, temperatures of the stator 110, the rotor 140, the capacitor 235, the inverter 231, and the terminal block 330 may rise due to heat generation.

When the operation is started, the cooling fluid which has a relatively low temperature due to being cooled while passing through the heat exchanger 392 may be introduced into the cooling fluid inlet portion 385.

The fluid introduced into the cooling fluid inlet portion 385 may then be introduced into the terminal block cooling portion 380 to cool the terminal block 330.

Heat generated while a current flows along the AC bus bar 264 and the power line 132 may be transferred to the terminal block cooling portion 380 through the terminal block 330 and the heat transfer member 360, so as to be removed (cooled) by the cooling fluid.

Accordingly, the rise in the temperature of the terminal block 330 can be prevented, and thus an increase in electric resistance due to high temperature can be prevented, thereby allowing a smooth power supply to the stator 110.

The cooling fluid of the terminal block cooling portion 380 may be introduced into the flow path extending portion 225 through the communicating portion 386.

The cooling fluid inside the flow path extending portion 225 may be brought into contact with the plurality of cooling fins 260 of the inverter mounting portion 250*a* so as to cool the inverter mounting portion 250*a*.

As a result, the temperature rise of the inverter 231 can be prevented, thereby preventing an error and/or a reduction of a lifespan of the inverter 231 due to the high temperature.

The cooling fluid of the first partial flow path 220*a* may flow into the second partial flow path 220*b* through the first flow path communicating portion 280*a* of the second case cover 290.

Accordingly, the capacitor mounting portion 250*b* may be cooled, thereby preventing a reduction of a lifespan of the capacitor 235 due to the high temperature.

The cooling fluid of the second partial flow path 220*b* may flow into the third partial flow path 220*c* through the second flow path communicating portion 280*b* of the first case cover 270.

The cooling fluid of the third partial flow path 220*c* may then flow along the fourth partial flow path 220*d* to the eleventh partial flow path 220*k*, which are connected in series through the flow path communicating portion 280, so as to cool the case body 190.

As a result, the stator 110 and the rotor 140 inside the case body 190 may be cooled, and the increase in the electric resistance due to the high temperature may be prevented, thereby preventing a deterioration of efficiencies and a reduction of lifespan of the stator 110 and the rotor 140.

On the other hand, the stator vibration suppressing unit 130, the inverter vibration suppressing unit, and the capacitor vibration suppressing unit can prevent the generation of vibration from the stator 110, the inverter 231, and the capacitor 235.

This may result in enabling a quiet operation, and preventing damage to the stator 110, the inverter 231, and the capacitor 235 due to the vibration generation.

Hereinafter, another embodiment of the present invention will be described with reference to FIGS. 15 to 19.

Figure 15:
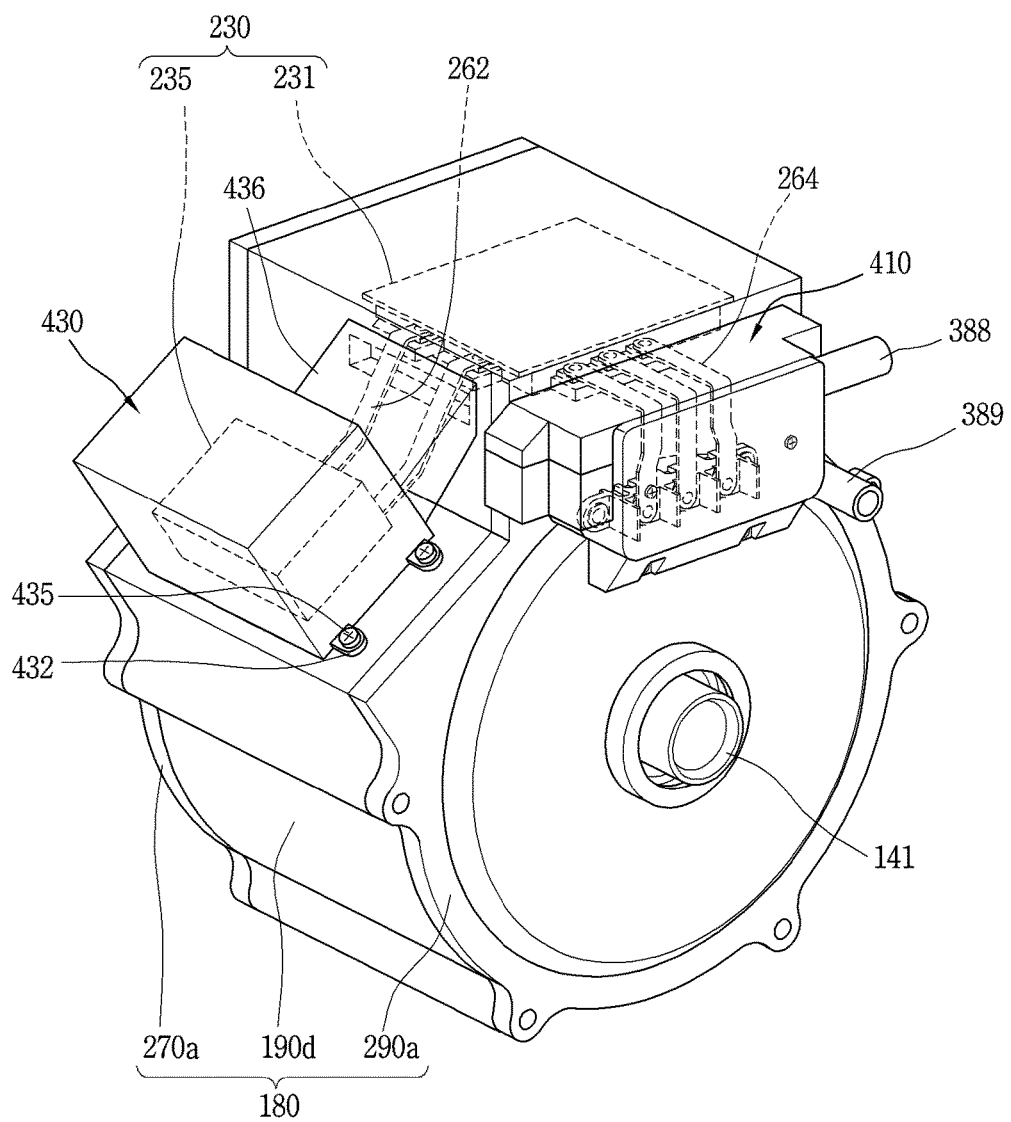
FIG. 15 is a perspective view of an electric motor having a case for an electric motor in accordance with another embodiment of the present invention.
Figure 16:
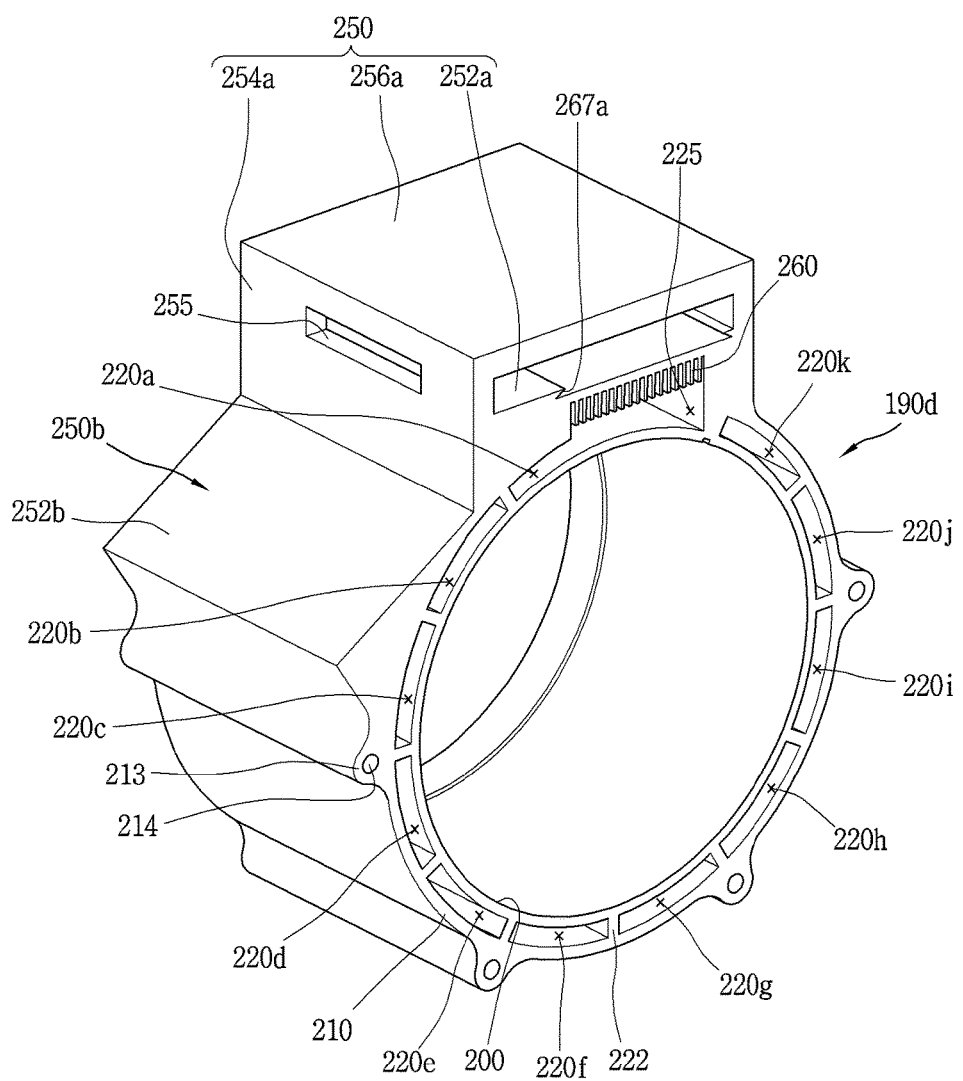
FIG. 16 is a perspective view of a case body of FIG. 15.
Figure 17:
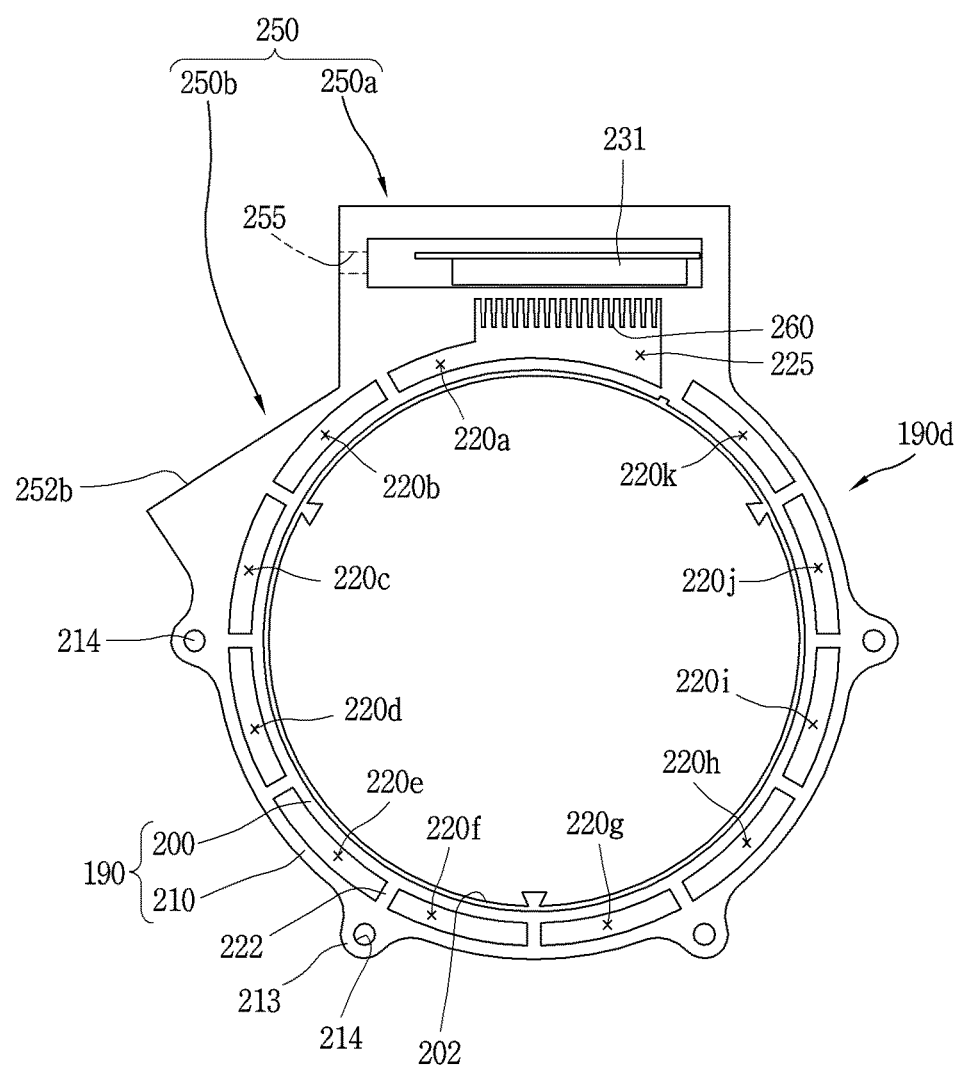
FIG. 17 is a front view of a case body of FIG. 16.

Referring now to FIGS. 15 to 17 (and with reference to FIGS. 4 and 11 for elements not specifically shown in FIGS. 15 to 17), an electric motor having a motor case according to one embodiment of the present invention may include a stator 110 having a stator core 120 and a stator coil 131 wound on the stator core 120, a rotor 140 having a rotating shaft 141 and rotatably disposed at a predetermined gap with the stator core 120, and a case 180 for an electric motor according to the one embodiment of the present invention in which the stator 110 and the rotor 140 are accommodated.

The case 180 may include a case body 190*d* formed therethrough in an axial direction, and case covers 270*a* and 290*a* provided on both sides of the case body 190*d*, respectively.

A circuit component mounting portion 250 on which a circuit component 230 is mounted may be provided outside the case body 190*d*.

The circuit component 230 may include, for example, an inverter 231 that varies a frequency of the power source.

The circuit component 230 may include a capacitor 235, for example.

The case 180 may include a case body 190*d* provided with an inner case 200 having a stator accommodating space 201 penetratingly formed therein in the axial direction, an outer case 210 disposed outside the inner case 200 and forming a cooling fluid flow path penetratingly formed in the axial direction together with the inner case 200, and a circuit component mounting portion 250 disposed outside the outer case 210 to mount the circuit component thereon such that the circuit component 230 is cooled by the cooling fluid, and case covers 270*a* and 290*a* coupled to both sides of the case body 190*d* to block the stator accommodating space 201 and the cooling fluid flow path 220, respectively.

A plurality of barrier walls 222 for partitioning the flow path may be provided between the inner case 200 and the outer case 210.

The flow path 220 may be partitioned into a plurality of partial flow paths 220*a* to 220*k* by the barrier walls 222.

The plurality of partial flow paths 220*a* to 220*k* may include, for example, a first partial flow path 220*a* to an eleventh partial flow path 220*k*.

The circuit component mounting portion 250 may include, for example, an inverter mounting portion 250*a* on which the inverter 231 is mounted.

The inverter mounting portion 250*a* may include an inverter mounting surface 252*a* protruding from an outer surface of the outer case 210.

The inverter mounting portion 250*a* may include a side surface 254*a* protruding from the inverter mounting surface 252*a*, and a ceiling surface 256*a* extending from the side surface 254*a*.

The inverter mounting portion 250*a* may be provided with an inverter mounting space 258*a* penetratingly formed therein in the axial direction.

The circuit component mounting portion 250 may include, for example, a capacitor mounting portion 250*b* on which the capacitor 235 is mounted.

The capacitor mounting portion 250*b* may be formed, for example, adjacent to the inverter mounting portion 250*a*.

The capacitor mounting portion 250*b* may be provided with a capacitor mounting surface 252*b* protruding from the outer surface of the outer case 210, for example.

The capacitor mounting surface 252*b* may have a rectangular shape.

A penetrating portion 255 may be formed through one side surface (for example, the side surface 254*a*) of the inverter mounting portion 250*a*.

A DC bus bar 262 connecting the capacitor 235 and the inverter 231 may be accommodated in the penetrating portion 255.

A capacitor case 430 for accommodating the capacitor 235 therein may be coupled to the capacitor mounting portion 250*b*.

The capacitor case 430 may have, for example, a rectangular parallelepiped shape with one side surface open.

The capacitor case 430 may be provided with coupling portions 432 in which coupling members 435 coupled to the capacitor mounting portion 250*b* are inserted.

An accommodating portion 436 for accommodating the DC bus bar 262 may be provided on one side surface of the capacitor case 430.

The accommodating portion 436 may protrude to communicate with the inside of the capacitor case 430.

The cooling fluid flow path 220 may include a flow path extending portion 225 extending toward the inverter mounting portion 250a.

A plurality of cooling fins 260 which may be brought into contact with the fluid within the flow path extending portion 225 may be provided on a lower portion (the inverter mounting surface 252a) of the inverter mounting portion 250a.

The plurality of cooling fins 260 may extend along the axial direction, respectively.

The case covers 270a and 290a may include a first case cover 270a and a second case cover 290a provided on both sides of the case body 190d, respectively.

Each of the first case cover 270a and the second case cover 290a may be provided with a first blocking part 292 (refer to FIG. 11) for blocking the stator accommodating space 201 and the flow path 220, and a second blocking part 294 (refer to FIG. 11) for blocking the inverter mounting space 258a.

Figure 18:
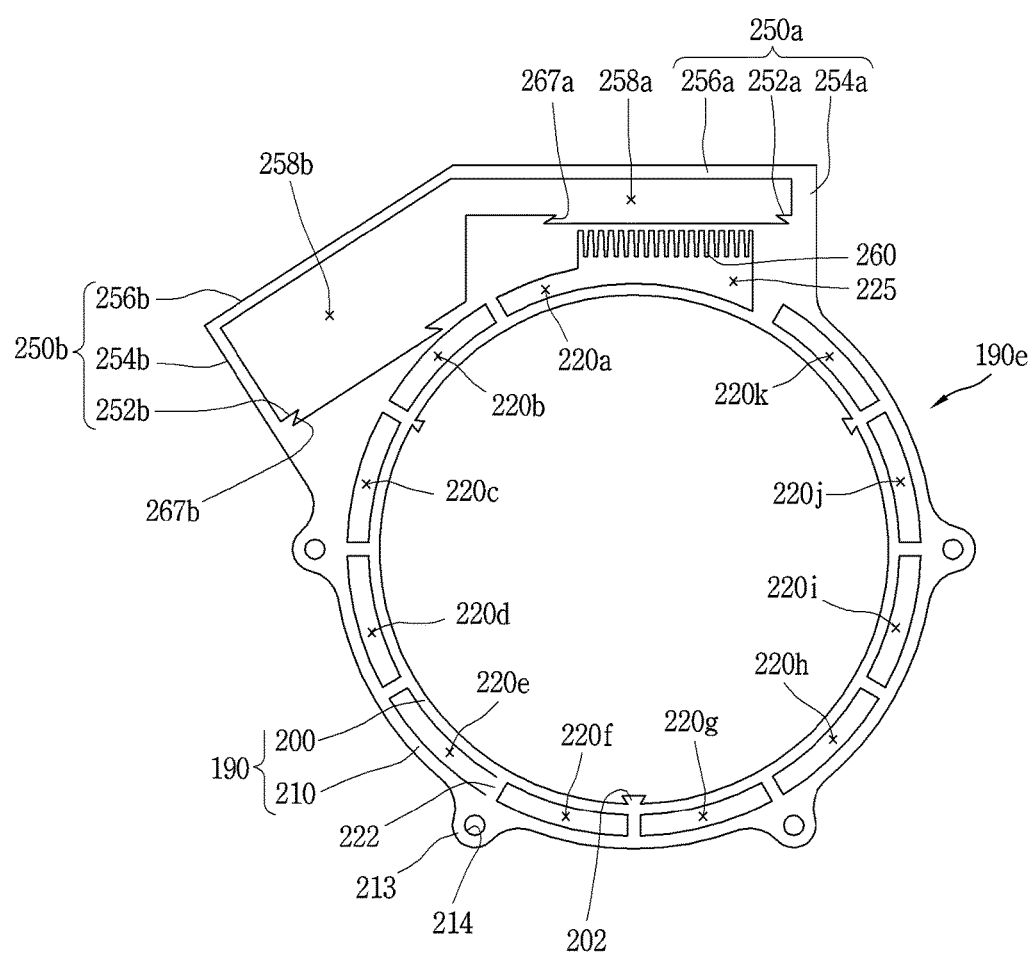
FIG. 18 is a view illustrating a variation of the case body of FIG. 16.

Referring now to FIG. 18 (and with reference to FIGS. 4 and 11 for elements not specifically shown in FIG. 18), a case body 190e may include an inner case 200 having a stator accommodating space 201 penetratingly formed therein in the axial direction, an outer case 210 disposed outside the inner case 200 in a radial direction and forming a cooling fluid flow path 220 penetratingly formed in the axial direction and spaced apart from the inner space 200, and a circuit component mounting portion 250 disposed outside the outer case 210 to mount a circuit component 230 thereon such that the circuit component 230 is cooled by the cooling fluid.

The circuit component mounting portions 250a and 250b may include an inverter mounting surface 252a on which the inverter 231 is mounted, a capacitor mounting surface 252b on which the capacitor 235 is mounted, side surfaces 254a and 254b protruding from each one side portion of the inverter mounting surface 252a and the capacitor mounting surface 252b, and extending surfaces 256a and 256b extending from the side surfaces 254a and 254b.

The circuit component mounting portions 250a and 250b may be provided therein with an inverter mounting space 258a for mounting the inverter 231 therein, and a capacitor mounting space 258b for mounting the capacitor 235 therein.

The inverter mounting space 258a and the capacitor mounting space 258b may communicate with each other.

The inverter mounting surface 252a of the inverter mounting space 258a may be provided with a coupling protrusion receiving portion 267a for receiving a coupling protrusion of the inverter 231 therein.

The capacitor mounting surface 252b of the capacitor mounting space 258b may be provided with a coupling protrusion receiving portion 267b for receiving a coupling protrusion of the capacitor 235 therein.

A flow path extending portion 225 that the cooling fluid flow path 220 extends toward the inverter mounting space 258a may be provided below the inverter mounting space 258a.

The inverter mounting surface 252a of the inverter mounting space 258a may be provided with a plurality of cooling fins 260 which are brought into contact with the fluid inside the flow path extending portion 225.

Figure 19:
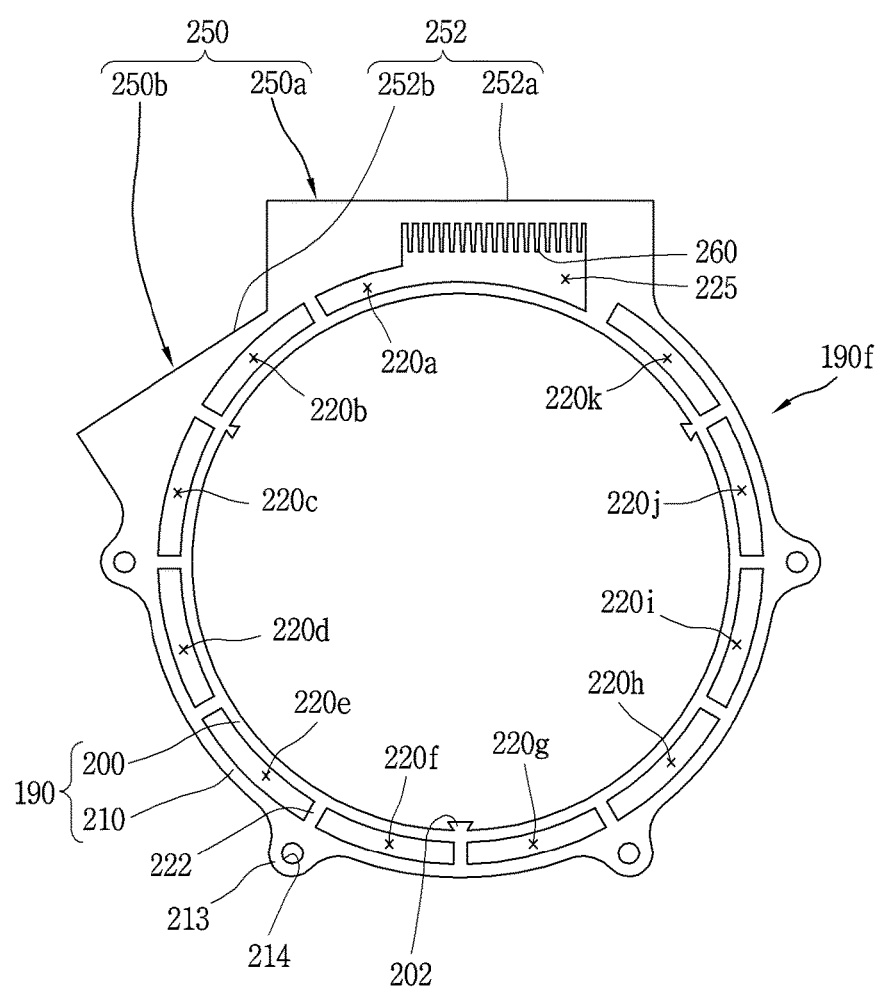
FIG. 19 is a view illustrating a variation of the case body of FIG. 16.

Referring now to FIG. 19 (and with reference to FIGS. 4 and 11 for elements not specifically shown in FIG. 19), a case body 190f may include an inner case 200 having a stator accommodating space 201 penetratingly formed therein in an axial direction, an outer case 210 disposed outside the inner case 200 and forming a cooling fluid flow path 220 penetratingly formed in the axial direction, and a circuit component mounting portion 250 to mount the circuit component thereon such that the circuit component 230 is cooled by the cooling fluid.

The circuit component mounting portion 250 may be provided with a circuit component mounting surface 252 on which the circuit component 230 is mounted.

The circuit component mounting surface 252 may have a rectangular shape protruding from an outer surface of the outer case 210, for example.

The circuit component mounting surface 252 may be provided, for example, in plurality.

The circuit component mounting surface 252 may be provided with a first mounting surface 252a, and a second mounting surface 252b formed at one side of the first mounting surface 252a in a circumferential direction of the inner case 200.

The first mounting surface 252a may be an inverter mounting surface 252a on which the inverter 231 is mounted.

The second mounting surface 252b may be a capacitor mounting surface 252b on which the capacitor 235 is mounted.

The first mounting surface 252a may be provided at one side thereof with a flow path extending portion 225 extending toward the first mounting surface 252a, for example.

A plurality of cooling fins 260 extending from the first mounting surface 252a may be provided in the flow path extending portion 225.

As described above, according to one embodiment of the present invention, by constituting a case body in which a cooling fluid flow path is formed in an axially penetrating manner between an inner case and an outer case for accommodating an electric motor, and a circuit component mounting portion is provided outside of the outer case to be cooled by the cooling fluid, all of the electric motor and the circuit component can be cooled by using the single cooling fluid flow path.

Accordingly, since a case for the circuit component and a cooling member for cooling the circuit component are not separately required, the size and weight of the case can be reduced.

Specifically, since the case body is formed penetratingly in the axial direction, it can be consecutively fabricated in an extruding manner, which may facilitate the fabrication of the case.

In addition, since the size of the case body is reduced, a relatively small space may be occupied by the case body when installed in a vehicle, thereby contributing to reducing an engine room and increasing a boarding space.

Since a weight of the case body can be reduced, an amount of battery consumption of the vehicle can be reduced when installed in the vehicle, thereby increasing a driving distance of the vehicle.

By providing a terminal block for connecting a power line (lead wire) connecting the circuit component to the stator, and a terminal block cooling portion for cooling the terminal block on case covers for blocking both sides of the case body, a temperature rise of a connection area of the power line can be prevented.

Further, the circuit component and the circuit component mounting portion may be provided with a circuit component vibration suppressing unit for preventing a generation of vibration from the circuit component, damage on the circuit component and/or a reduction of lifespan of the circuit component due to the vibration can be prevented.

The circuit component can be detached and attached in a sliding manner, which may facilitate an installation and separation of the circuit component.

The foregoing description has been given with respect to specific embodiments of the invention. However, the present invention may be embodied in various forms without departing from the spirit or essential characteristics thereof. Therefore, the above-described embodiments should not be limited by the details of the detailed description.

It should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A case for an electric motor, the case comprising:
   a case body including:
      an inner case, the inner case having a stator accommodating space located therein, the stator accommodating space extending in an axial direction of the inner case;
      an outer case disposed outwardly of the inner case, the outer case being spaced apart from the inner case to form a cooling fluid flow path between the inner case and the outer case; and
      a circuit component mounting portion provided on the outer case;
   a first case cover coupled to a first end portion of the case body, and a second case cover coupled to a second end portion of the case body, the first case cover and the second case cover being configured to cover the stator accommodating space, the first case cover and the second case cover being connected with the cooling fluid flow path; and
   a circuit component provided on the circuit component mounting portion,
   whereby the circuit component is cooled by cooling fluid provided within the cooling fluid flow path, and
   wherein the second case cover includes a terminal block configured to be connected to a power line extending from a stator of an electric motor.

2. The case of claim 1, wherein the second case cover includes a terminal block cooling portion for cooling the terminal block.

3. The case of claim 2, wherein the terminal block cooling portion includes a cooling fluid inlet portion through which the cooling fluid is introduced.

4. The case of claim 3, wherein the terminal block cooling portion includes a communicating portion communicating with the cooling fluid flow path.

5. The case of claim 3, further comprising a heat transfer member provided between the terminal block and the terminal block cooling portion for transferring heat of the terminal block to the terminal block cooling portion.

6. A case for an electric motor, the case comprising:
   a case body including:
      an inner case, the inner case having a stator accommodating space located therein, the stator accommodating space extending in an axial direction of the inner case;
      an outer case disposed outwardly of the inner case, the outer case being spaced apart from the inner case to form a cooling fluid flow path between the inner case and the outer case; and
      a circuit component mounting portion provided on the outer case;
   a first case cover coupled to a first end portion of the case body, and a second case cover coupled to a second end portion of the case body, the first case cover and the second case cover being configured to cover the stator accommodating space, the first case cover and the second case cover being connected with the cooling fluid flow path; and
   a circuit component provided on the circuit component mounting portion,
   whereby the circuit component is cooled by cooling fluid provided within the cooling fluid flow path,
   wherein the circuit component and the circuit component mounting portion include a circuit component vibration suppressing unit to suppress a transmission of vibration between the circuit component and the circuit component mounting portion, and
   wherein the circuit component vibration suppressing unit comprises:
      a coupling protrusion protruding from one of the circuit component and the circuit component mounting portion; and
      a coupling protrusion receiving portion provided on another of the circuit component and the circuit component mounting portion for receiving the coupling protrusion therein.

7. The case of claim 6, wherein the circuit component comprises an inverter,
   wherein the circuit component mounting portion comprises an inverter mounting portion where the inverter is mounted,
   wherein a length of the inverter in the axial direction is less than a length of the inverter mounting portion in the axial direction, and
   wherein at least one of the first and second case covers includes an inverter supporting portion in contact with the inverter to support the inverter in the axial direction.

8. The case of claim 7, wherein the coupling protrusion is provided on the inverter,
   wherein the inverter supporting portion protrudes from an inner surface of the at least one of the first and second case covers, and
   wherein the inverter supporting portion is configured to be inserted into the coupling protrusion receiving portion and brought into contact with the coupling protrusion.

9. The case of claim 7, wherein the inverter mounting portion includes a plurality of cooling fins in contact with the cooling fluid.

10. The case of claim 9, wherein the cooling fluid flow path includes a flow path extending portion extending toward the inverter mounting portion, and
    wherein the plurality of cooling fins are located within the flow path extending portion.

11. The case of claim 10, wherein the flow path extending portion extends in the axial direction, and
    wherein the plurality of cooling fins extend parallel to the axial direction.

12. The case of claim 6, wherein the circuit component comprises:
    an inverter; and
    a capacitor providing direct current (DC) power to the inverter, and wherein the circuit component mounting portion includes a capacitor mounting portion where the capacitor is mounted.

13. The case of claim 12, wherein a length of the capacitor in the axial direction is less than a length of the capacitor mounting portion in the axial direction, and
wherein at least one of the first and second case covers includes a capacitor supporting portion in contact with the capacitor to support the capacitor in the axial direction.

14. The case of claim 13, wherein the coupling protrusion is provided on the capacitor,
wherein the capacitor supporting portion protrudes from an inner surface of the at least one of the first and second case covers, and
wherein the capacitor supporting portion is configured to be inserted into the coupling protrusion receiving portion and brought into contact with the coupling protrusion.

15. The case of claim 1, wherein the case body further comprises a plurality of barrier walls located between the outer case and the inner case, the plurality of barrier walls partitioning the cooling fluid flow path in a circumferential direction of the case body to form a plurality of partial flow paths, and
wherein the first and second case covers include a plurality of flow path communicating portions communicating the plurality of partial flow paths with one another in series.

16. The case of claim 15, wherein the second case cover includes a cooling fluid outlet portion through which the cooling fluid is discharged.

17. A case for an electric motor, the case comprising:
a case body including:
an inner case, the inner case having a stator accommodating space located therein, the stator accommodating space extending in an axial direction of the inner case;
an outer case disposed outwardly of the inner case, the outer case being spaced apart from the inner case to form a cooling fluid flow path between the inner case and the outer case; and
a circuit component mounting portion provided on the outer case;
a first case cover coupled to a first end portion of the case body, and a second case cover coupled to a second end portion of the case body, the first case cover and the second case cover being configured to cover the stator accommodating space, the first case cover and the second case cover being connected with the cooling fluid flow path; and
a circuit component provided on the circuit component mounting portion,
whereby the circuit component is cooled by cooling fluid provided within the cooling fluid flow path, and
wherein the circuit component mounting portion includes:
a mounting surface provided on an outer surface of the outer case;
a side surface protruding from one side of the mounting surface; and
a ceiling surface extending from the side surface,
whereby the circuit component mounting portion provides a circuit component mounting space extending in the axial direction.

18. An electric motor comprising:
the case of claim 1;
a stator provided within the case; and
a rotor rotatably provided within the stator.

* * * * *